(12) United States Patent
Blaber et al.

(10) Patent No.: US 10,236,020 B2
(45) Date of Patent: Mar. 19, 2019

(54) NFT WITH MECHANICALLY ROBUST MATERIALS

(71) Applicant: Seagate Technology LLC, Cupertino, CA (US)

(72) Inventors: Martin Giles Blaber, Plymouth, MN (US); Michael Allen Seigler, Eden Prairie, MN (US); Michael Christopher Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/980,293

(22) Filed: May 15, 2018

(65) Prior Publication Data

US 2018/0261240 A1 Sep. 13, 2018

Related U.S. Application Data

(63) Continuation of application No. 15/443,188, filed on Feb. 27, 2017, now Pat. No. 9,972,346.

(60) Provisional application No. 62/300,796, filed on Feb. 27, 2016.

(51) Int. Cl.
| | | |
|---|---|---|
| *G11B 5/00* | (2006.01) | |
| *G11B 5/31* | (2006.01) | |
| *G11B 5/48* | (2006.01) | |
| *G11B 5/187* | (2006.01) | |
| *G11B 5/60* | (2006.01) | |

(52) U.S. Cl.
CPC .............. *G11B 5/314* (2013.01); *G11B 5/187* (2013.01); *G11B 5/1871* (2013.01); *G11B 5/3116* (2013.01); *G11B 5/4866* (2013.01); *G11B 5/6088* (2013.01); *G11B 2005/0021* (2013.01)

(58) Field of Classification Search
CPC ..... G11B 5/314; G11B 5/3116; G11B 5/3133; G11B 2005/0021; G11B 2005/0005; G11B 5/3903; G11B 5/6088; G11B 11/125
USPC ........... 360/59, 125.31, 313, 328; 369/13.13, 369/13.14, 13.33, 13.34
See application file for complete search history.

(56) References Cited

U.S. PATENT DOCUMENTS

| | | |
|---|---|---|
| 6,114,098 A | 11/2000 | Iyer |
| 7,773,330 B2 | 8/2010 | Itagi et al. |
| 7,911,882 B2 | 3/2011 | Shimazawa et al. |

(Continued)

FOREIGN PATENT DOCUMENTS

| | | |
|---|---|---|
| EP | 0580368 | 1/1994 |
| WO | WO2013163195 | 10/2013 |
| WO | WO2013163470 | 10/2013 |

OTHER PUBLICATIONS

U.S. Appl. No. 15/939,520, Cheng et al.

*Primary Examiner* — Nabil Z Hindi
(74) *Attorney, Agent, or Firm* — Hollingsworth Davis, LLC

(57) ABSTRACT

A recording head includes a near-field transducer proximate a media-facing surface. The near-field transducer comprises an aperture portion surrounded by walls of plasmonic material, the walls oriented normal to the media-facing surface. A notch protrudes within the aperture. The notch comprises at least one of Rh and Ir. A write pole is proximate the near-field transducer. The write pole has a back surface facing away from the media-facing surface and an aperture-facing surface proximate the aperture.

20 Claims, 39 Drawing Sheets

(56) References Cited

U.S. PATENT DOCUMENTS

| | | | |
|---|---|---|---|
| 8,040,761 | B2 | 10/2011 | Kawamori |
| 8,077,556 | B2 | 12/2011 | Komura |
| 8,149,657 | B2 | 4/2012 | Huang et al. |
| 8,248,897 | B2 | 8/2012 | Shimazawa et al. |
| 8,339,740 | B2 | 12/2012 | Zou et al. |
| 8,343,364 | B1 | 1/2013 | Gao et al. |
| 8,351,151 | B2 | 1/2013 | Katine et al. |
| 8,385,158 | B1 | 2/2013 | Hu |
| 8,400,902 | B2 | 3/2013 | Huang et al. |
| 8,427,925 | B2 | 4/2013 | Zhao et al. |
| 8,514,673 | B1 | 8/2013 | Zhao et al. |
| 8,599,656 | B2 | 12/2013 | Jin et al. |
| 8,773,956 | B1 | 7/2014 | Wang |
| 8,787,129 | B1 | 7/2014 | Jin et al. |
| 8,790,527 | B1 | 7/2014 | Lui |
| 8,830,800 | B1 | 9/2014 | Pitcher |
| 8,842,391 | B2 | 9/2014 | Zou et al. |
| 8,934,198 | B2 | 1/2015 | Zou |
| 8,976,634 | B2 | 3/2015 | Cheng |
| 8,988,827 | B1 | 3/2015 | Balamane et al. |
| 9,042,210 | B2 * | 5/2015 | Macken ............... G11B 5/314 369/13.33 |
| 9,058,824 | B2 | 6/2015 | Cheng |
| 9,099,112 | B1 | 8/2015 | Balamane et al. |
| 9,147,427 | B1 | 9/2015 | Lee et al. |
| 9,245,573 | B2 | 1/2016 | Sahoo et al. |
| 9,263,074 | B2 | 2/2016 | Huang |
| 9,281,003 | B2 | 3/2016 | Zhao |
| 9,286,931 | B2 | 3/2016 | Jayashankar |
| 9,305,575 | B2 | 4/2016 | Zhao et al. |
| 9,336,800 | B2 | 5/2016 | Wessel et al. |
| 9,384,770 | B2 | 7/2016 | Chen et al. |
| 9,449,625 | B1 | 9/2016 | Vossough et al. |
| 9,449,626 | B2 | 9/2016 | Lee et al. |
| 9,502,070 | B2 | 11/2016 | Cheng et al. |
| 9,721,593 | B2 | 8/2017 | Blaber et al. |
| 9,799,352 | B1 | 10/2017 | Chen et al. |
| 9,972,346 | B2 | 5/2018 | Blaber et al. |
| 2010/0104768 | A1 | 4/2010 | Xiao |
| 2010/0123965 | A1 | 5/2010 | Lee et al. |
| 2010/0214685 | A1 | 8/2010 | Seigler et al. |
| 2010/0321814 | A1 | 12/2010 | Zou et al. |
| 2010/0329085 | A1 | 12/2010 | Kawamori |
| 2011/0002199 | A1 | 1/2011 | Takayama et al. |
| 2011/0096431 | A1 | 4/2011 | Hellwig |
| 2011/0205863 | A1 | 8/2011 | Zhao et al. |
| 2011/0209165 | A1 | 10/2011 | Tsai |
| 2012/0105996 | A1 | 5/2012 | Katine et al. |
| 2013/0148485 | A1 | 6/2013 | Jin et al. |
| 2013/0170332 | A1 | 7/2013 | Gao |
| 2013/0235707 | A1 | 9/2013 | Zhao et al. |
| 2013/0279314 | A1 | 10/2013 | Peng |
| 2013/0279315 | A1 | 10/2013 | Zhao et al. |
| 2013/0288077 | A1 | 10/2013 | Dhawam et al. |
| 2013/0330573 | A1 | 12/2013 | Zhao et al. |
| 2013/0343167 | A1 | 12/2013 | Zou et al. |
| 2014/0004384 | A1 | 1/2014 | Zhao et al. |
| 2014/0050058 | A1 | 2/2014 | Zou et al. |
| 2014/0251948 | A1 | 9/2014 | Zhao et al. |
| 2014/0254335 | A1 | 9/2014 | Gage et al. |
| 2014/0307534 | A1 | 10/2014 | Zhou |
| 2014/0313872 | A1 | 10/2014 | Rawat |
| 2014/0374376 | A1 | 12/2014 | Jayashankar |
| 2014/0376341 | A1 | 12/2014 | Wessel et al. |
| 2014/0376342 | A1 | 12/2014 | Wessel et al. |
| 2014/0376344 | A1 | 12/2014 | Zhao et al. |
| 2014/0376349 | A1 | 12/2014 | Cheng |
| 2015/0043319 | A1 | 2/2015 | Kasuya |
| 2015/0063086 | A1 | 3/2015 | Wierman |
| 2015/0117170 | A1 | 4/2015 | Zhao et al. |
| 2015/0131418 | A1 | 5/2015 | Huang |
| 2015/0179194 | A1 | 6/2015 | Cheng |
| 2015/0340052 | A1 | 11/2015 | Sankar |
| 2015/0380020 | A1 | 12/2015 | Cheng |
| 2016/0133288 | A1 | 5/2016 | Zhao et al. |
| 2016/0133291 | A1 | 5/2016 | Chen et al. |
| 2016/0260448 | A1 | 9/2016 | Zhao et al. |
| 2016/0284365 | A1 | 9/2016 | Brons et al. |
| 2016/0351209 | A1 | 12/2016 | Chen et al. |
| 2016/0351214 | A1 | 12/2016 | Kautzky et al. |
| 2016/0351221 | A1 | 12/2016 | Blaber et al. |
| 2016/0351222 | A1 | 12/2016 | Blaber et al. |

* cited by examiner

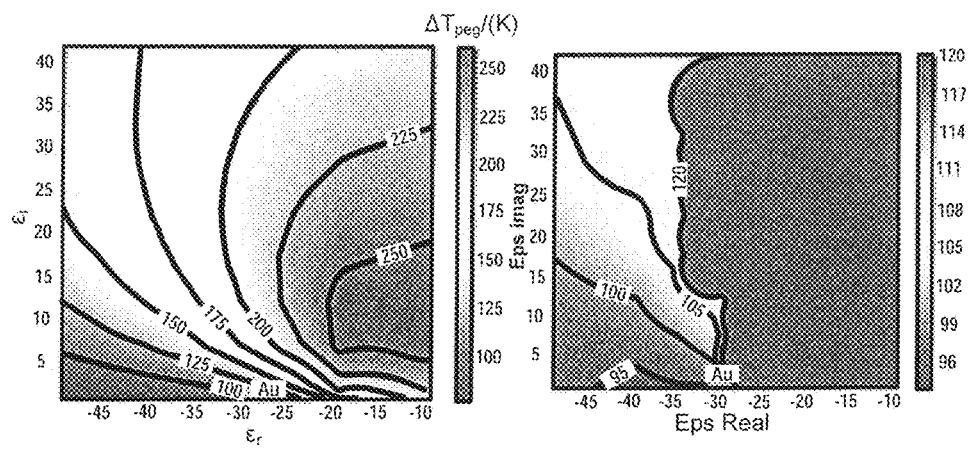
FIG. 17A       FIG. 17B
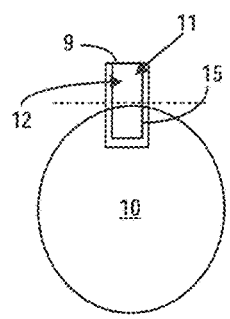 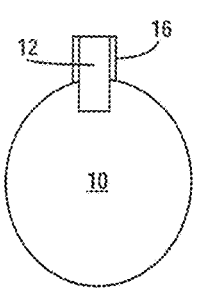 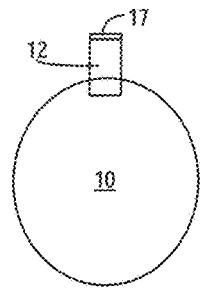
FIG. 18A       FIG. 18B       FIG. 18C
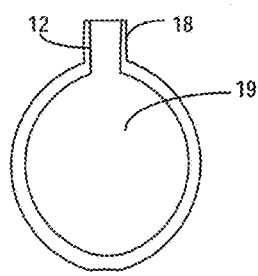
FIG. 18D
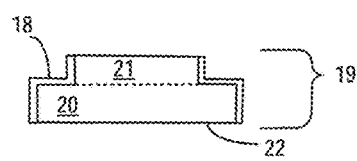
FIG. 18E Top Down View ABS View Cross Section View

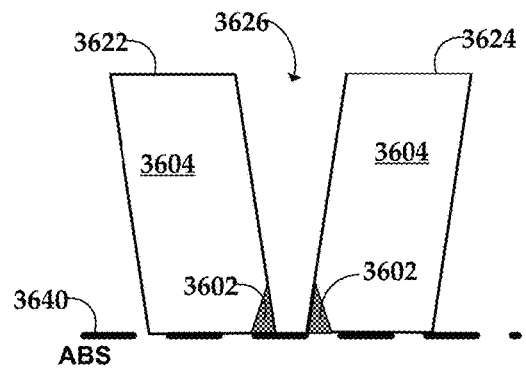
Top Down View        *FIG. 36A*
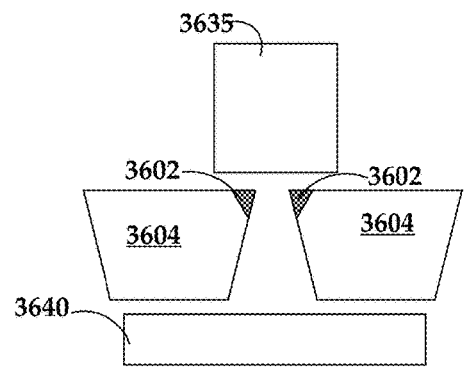
ABS View        *FIG. 36B*
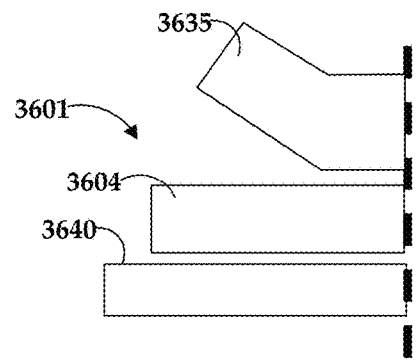
Cross Section View        *FIG. 36C*

Top Down View

ABS View

Cross Section View

Top Down View

ABS View

Cross Section View

Top Down View

ABS View

Cross Section View

Top Down View

ABS View

Cross Section View

NFT WITH MECHANICALLY ROBUST MATERIALS

RELATED PATENT DOCUMENTS

This application is a continuation of U.S. patent application Ser. No. 15/443,188, filed on Feb. 27, 2017, which claims the benefit of Provisional Patent Application No. 62/300,796 filed on Feb. 27, 2016, which is incorporated herein by reference in its entirety. U.S. application Ser. No. 15/166,799, filed on May 27, 2016 which claims the benefit of Provisional Patent Application No. 62/300,796 filed on Feb. 27, 2016 is also herein incorporated by reference in its entirety.

SUMMARY

Embodiments described herein involve a recording head comprising a near-field transducer proximate a media-facing surface. The near-field transducer comprises an aperture portion surrounded by walls of plasmonic material, the walls oriented normal to the media-facing surface. A notch protrudes within the aperture. The notch comprises at least one of Rh and Ir. A write pole is proximate the near-field transducer. The write pole has a back surface facing away from the media-facing surface and an aperture-facing surface proximate the aperture.

Embodiments described herein involve a recording head comprising a near-field transducer proximate a media-facing surface. The near-field transducer comprises an aperture portion surrounded by walls of plasmonic material, the walls oriented normal to the media-facing surface. At least two notches protrude within the aperture, the at least two notches comprising at least one of Rh and Ir. A write pole is proximate the near-field transducer. The write pole has a back surface facing away from the media-facing surface and an aperture-facing surface proximate the aperture.

Embodiments described herein involve a method comprising propagating light via a waveguide from an energy source to a near-field transducer near a media-facing surface of a recording head. Surface plasmons are excited along walls of an aperture of the near-field transducer and along a notch protruding within the aperture. The walls are formed of a plasmonic material and are oriented normal to the media-facing surface. The walls and the notch direct the surface plasmons to a recording medium. The notch comprises at least one of Rh and Ir. A magnetic field is generated at the recording medium via a write pole proximate the near-field transducer. The write pole has a back surface facing away from the media-facing surface and an aperture-facing surface proximate the aperture.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIGS. 17A and 17B are graphs showing the effective of the real and imaginary parts of the permittivity of the peg material on the peg temperature (FIG. 17A) and the cross track erasure (FIG. 17B);

FIGS. 18A-18E show diagrams including optional adhesion layers in possible illustrative configurations;

FIGS. 36A-36C show views of a gap NFT having a small corner made from a mechanically robust material in accordance with embodiments described herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
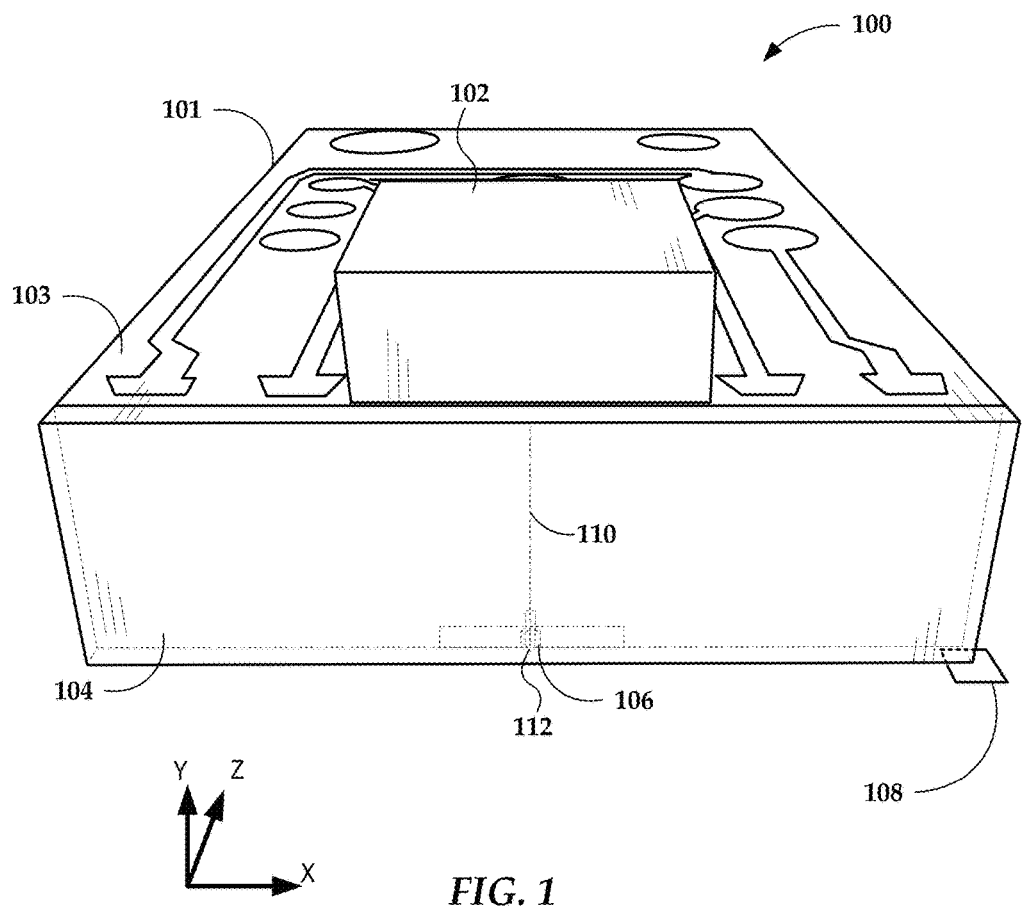
FIG. 1 is a perspective view of a hard drive slider that includes a waveguide in accordance with embodiments described herein.
Figure 2A:
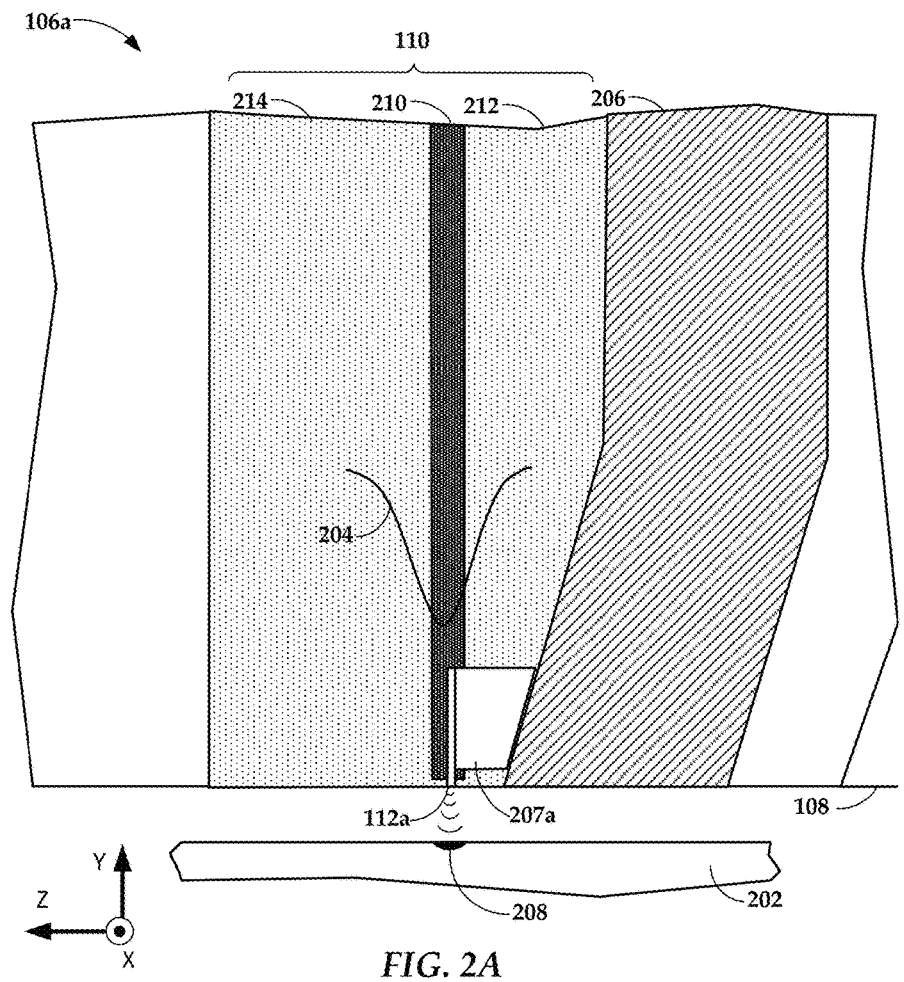
FIGS. 2A-2E are a cross-sectional views showing details of a HAMR apparatus in accordance with embodiments described herein.
Figure 2B:
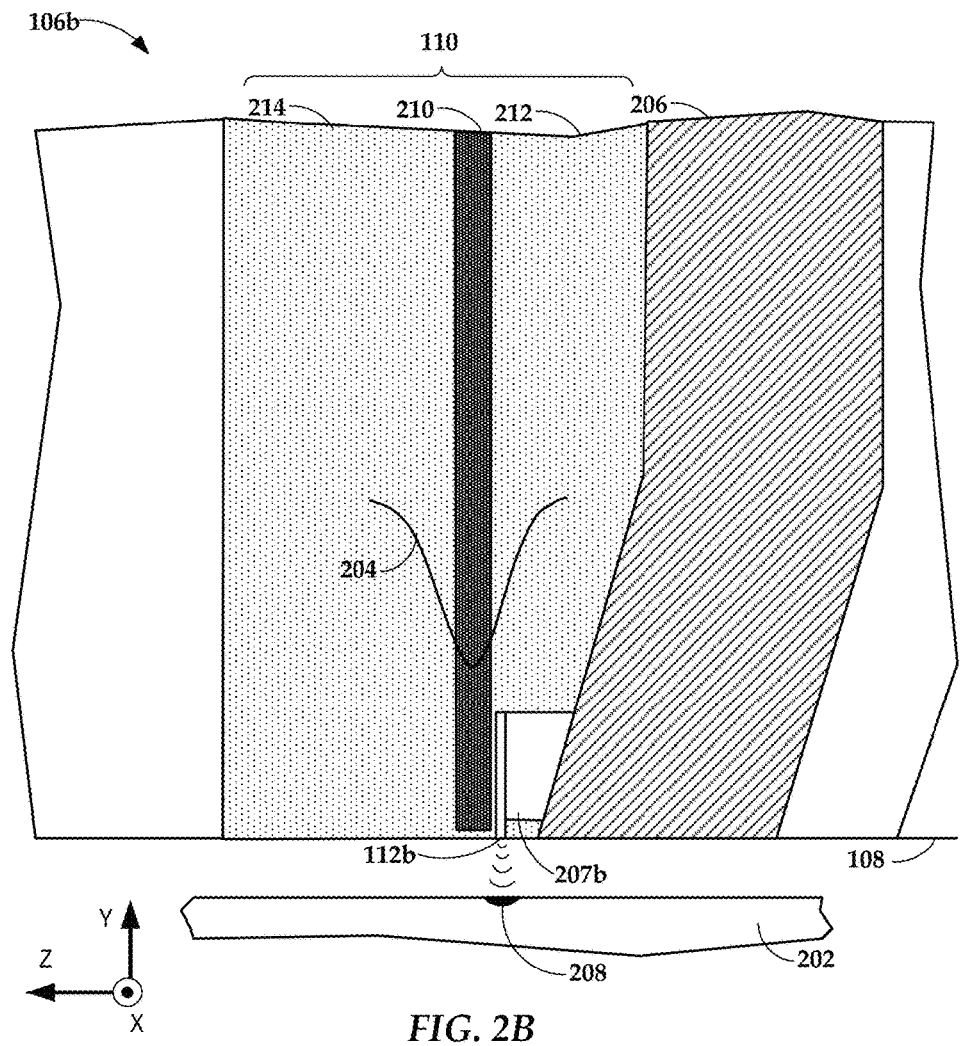
Figure 2C:
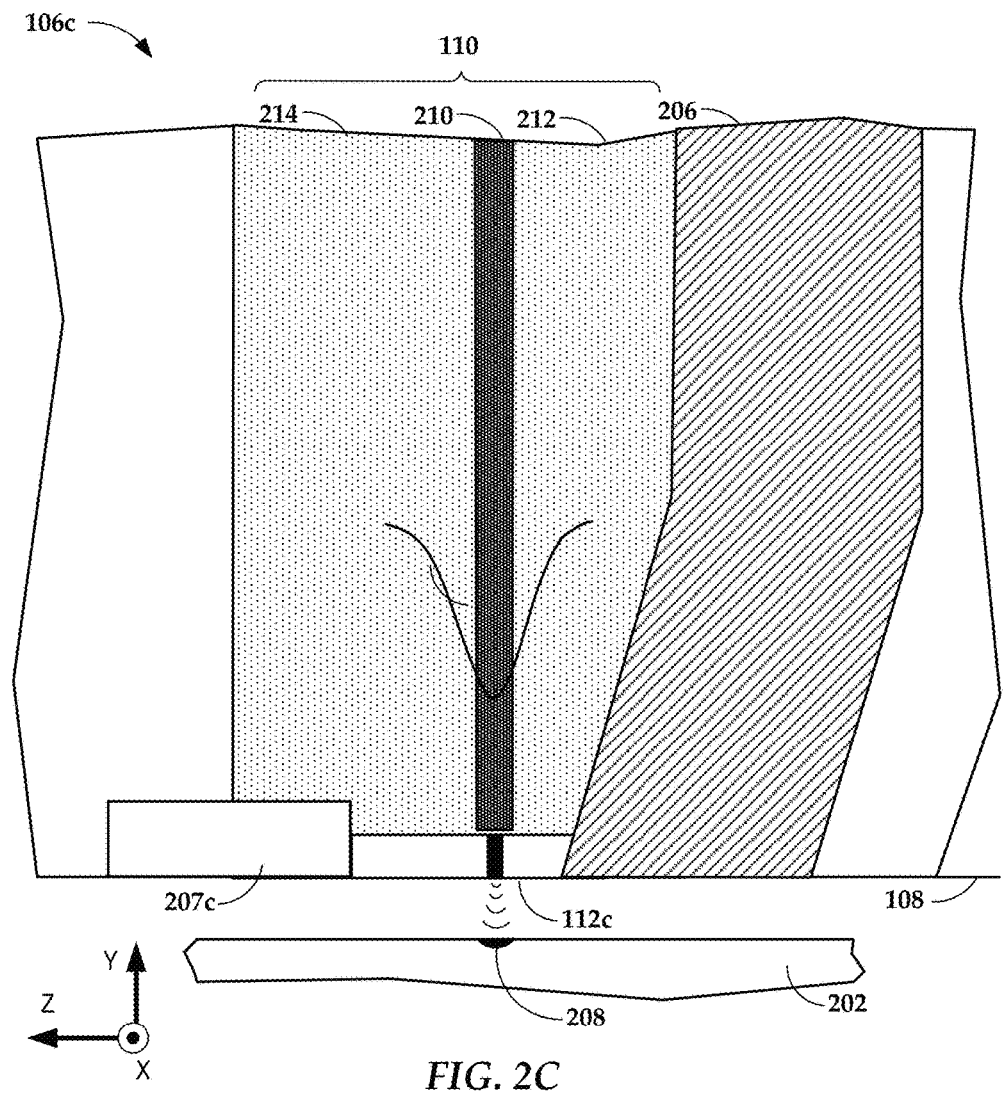
Figure 2D:
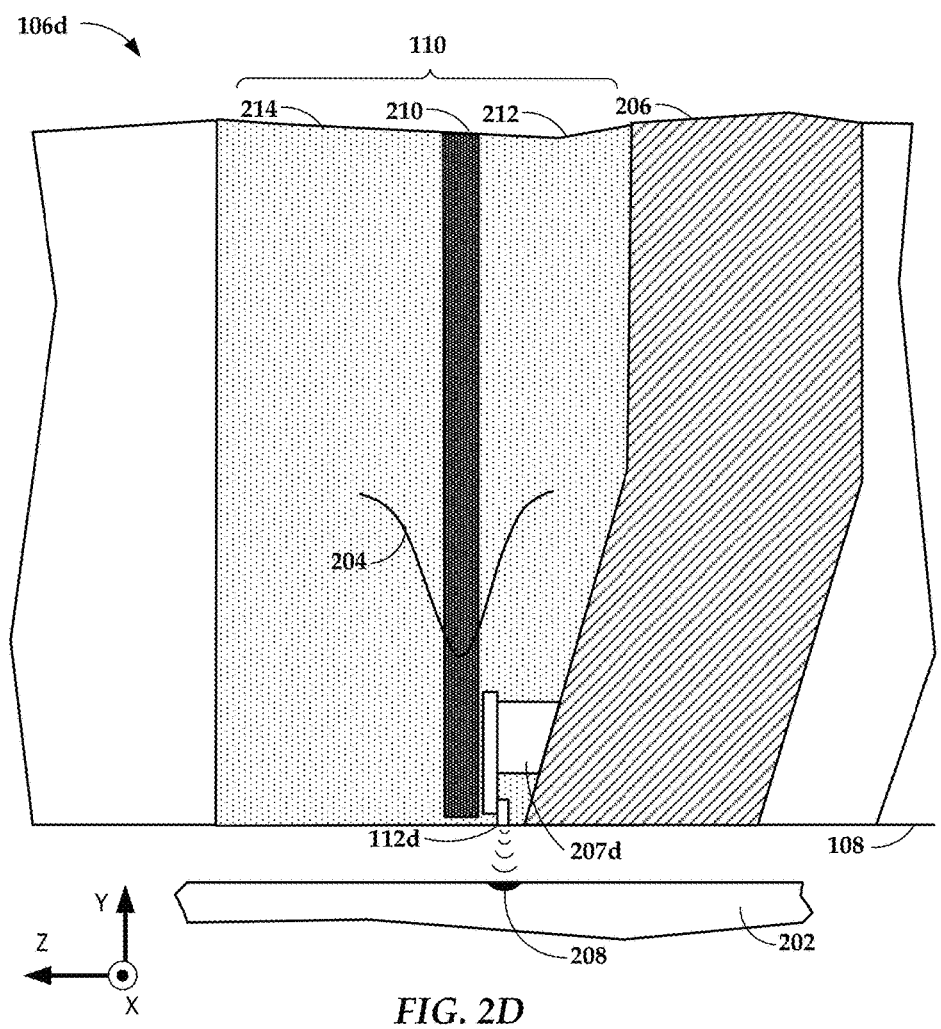
Figure 2E:
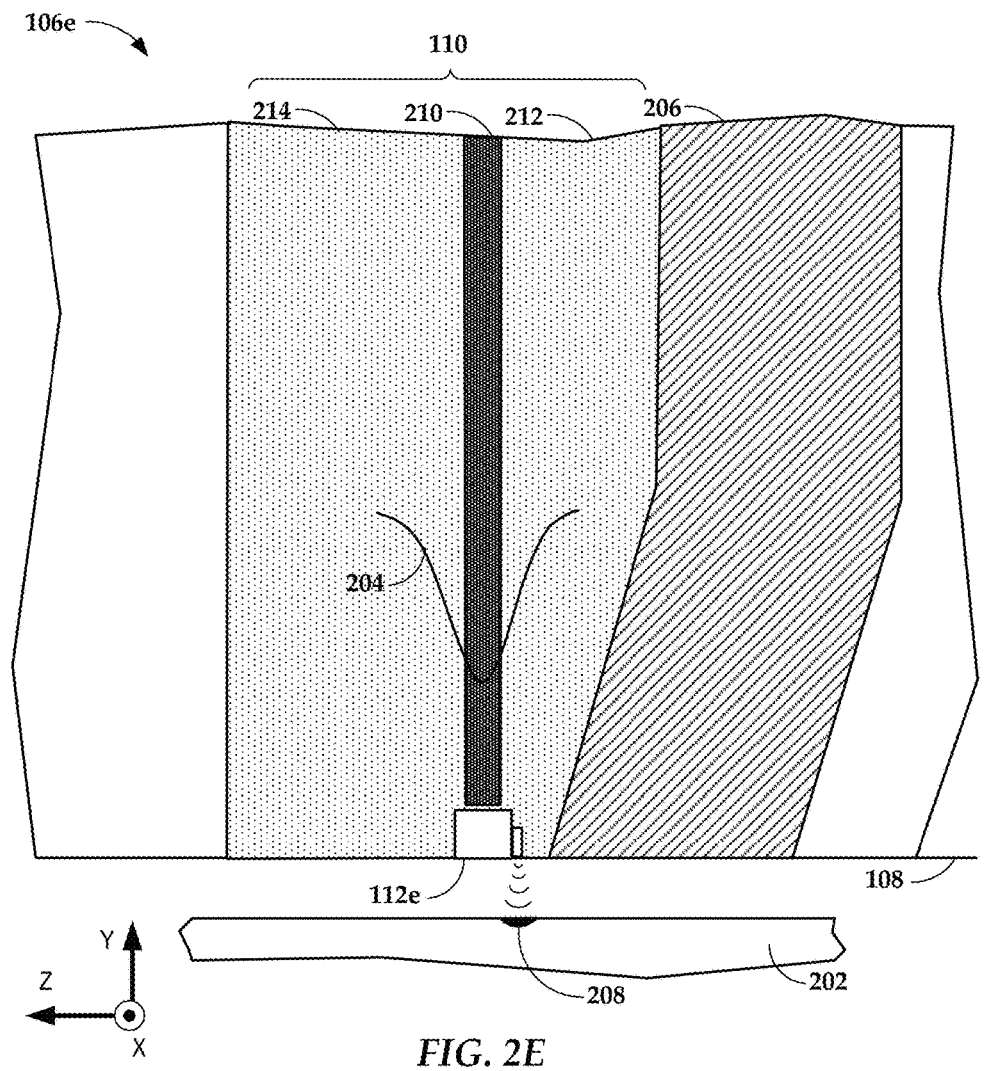

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include near field transducers (NFTs) for delivering electromagnetic energy to a confined area of a rotating media, the area (spot size) exposed to the electromagnetic energy is heated, at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm.

Due to the intensity of the laser light and the small size of the NFT, the NFT and surrounding material are subject to a significant rise in temperature during writing. Over time, this can affect the integrity and/or reliability of the NFT, for example, causing it to become misshapen or recess, undergo chemical changes, migrate, diffuse or otherwise be altered in a way that prevents effective coupling of energy from the near field transducer into the media. Other events, such as contact between the read/write head and recording medium, contamination, etc., may also degrade the operation of the NFT and nearby optical components. Degradation of the NFT will affect the effective service life of a HAMR read/write head. In view of this, methods and apparatuses described herein are used to increase the thermal and/or mechanical robustness of the NFT, such as at a peg that extends towards the recording media. A thermally robust material may be referred to herein as a mechanically robust material and/or a hard material and/or a chemically robust material. Chemical robustness may indicate a resistance to chemical change in the presence of oxidizers, acids, bases, etc.

In reference to FIG. 1, a perspective view shows a HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, which may include a mode converting waveguide system 110, are formed integrally within the slider body 101 (near a trailing edge surface 104 in this example) and function as an optical path that delivers energy from the laser diode 102 to the recording media via a near-field transducer (NFT) 112. The NFT 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

In reference now to FIGS. 2A-2E, cross-sectional views show details of HAMR devices 106a-106e according to example embodiments. FIGS. 2A-2E show different NFT 112-112e configurations. The NFT 112a-112e is located proximate a media-facing surface 108 (e.g., ABS), which is held near a magnetic recording media 202 during device operation. The NFT 112a-112e may include a heat sink 207a-207d that draws away some heat, e.g., to the write pole 206 or other nearby heat-conductive component. The media-facing surface 108 is arranged parallel to the x-z plane. A waveguide core 210 may be disposed proximate the NFT 112a-112e, which is located at or near the media writing surface 108.

The waveguide core 210 surrounded by cladding layers 212, 214. The waveguide core 210 and cladding layers 212, 214 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, $Al_xO_y$, etc. Generally, the dielectric materials are selected so that the refractive index of the waveguide core layer 210 is higher than refractive indices of the cladding layers 212, 214. This arrangement of materials facilitates efficient propagation of light through the waveguide. Light is delivered from the waveguide core 210 along the negative y-direction where it is coupled to the NFT 112a-112e. The NFT 112a-112e delivers surface plasmon enhanced, near-field electromagnetic energy along the y-axis where it exits at the media writing surface 202. This may result in a highly localized hot spot 208 on the media surface 202 when the media 204 placed in close proximity to surface 202 of the apparatus 106a-106e. Further illustrated in FIGS. 2A-2E is a recording pole 206 of the read/write head that is located alongside the NFT 112a-112e. The recording pole 206 generates a magnetic field (e.g., perpendicular field) used in changing the magnetic orientation of the hotspot 208 during writing.

Figure 3:
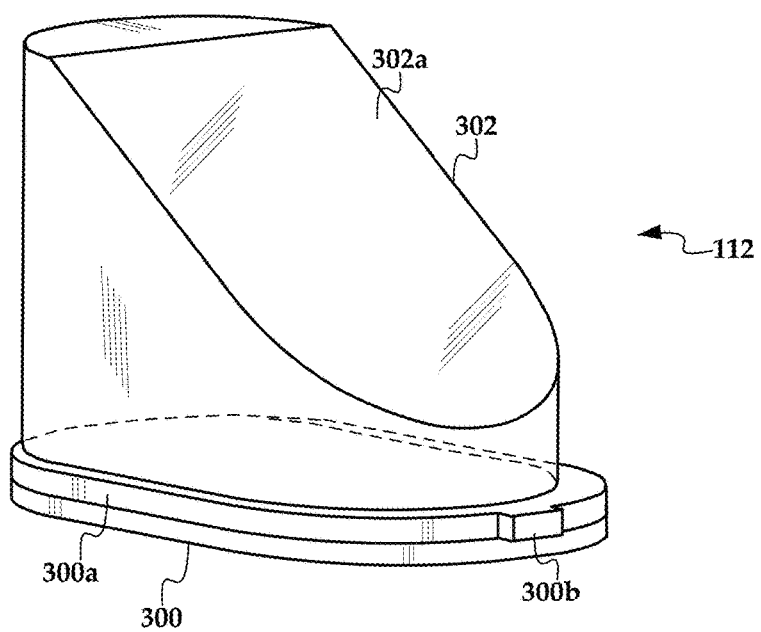
FIG. 3 is a perspective view of a near-field transducer according to an illustrative embodiment.

In FIG. 3, a perspective views show details of a device including a NFT. The device 112 can include two parts: a disc 300 and a heat sink 302 proximate to (e.g., deposited directly on to) the disc 300. In this example, the outline of the disc 300 on the xz-plane (which is a substrate-parallel plane) is enlarged relative to the heat sink 302, although they may be the same size. The heat sink 302 can include an angled surface 302a that is located proximate to a write pole (see, e.g., write pole 206 in FIG. 2) or other heat sinking infrastructure.

The disc 300 includes a top disc 300a that acts as a collector of optical energy from a waveguide and/or focusing element. The disc 300 achieves surface plasmon resonance in response to the optical energy and the surface plasmon energy is directed to the medium via a peg 300b that extends from the disc 300. It should be noted that the heat sink may also contribute to the energy transfer process and in some such embodiments a NFT does not necessarily include a separate disc and heat sink but a single component that can act as both. In this example, the disc 300 is configured as an elongated plate with rounded (e.g., circular) ends, also referred to as a stadium or capsule shape. Other enlarged portion geometries may be used, including circular, rectangular, triangular, ellipsoidal, parabolic etc.

Figure 4:
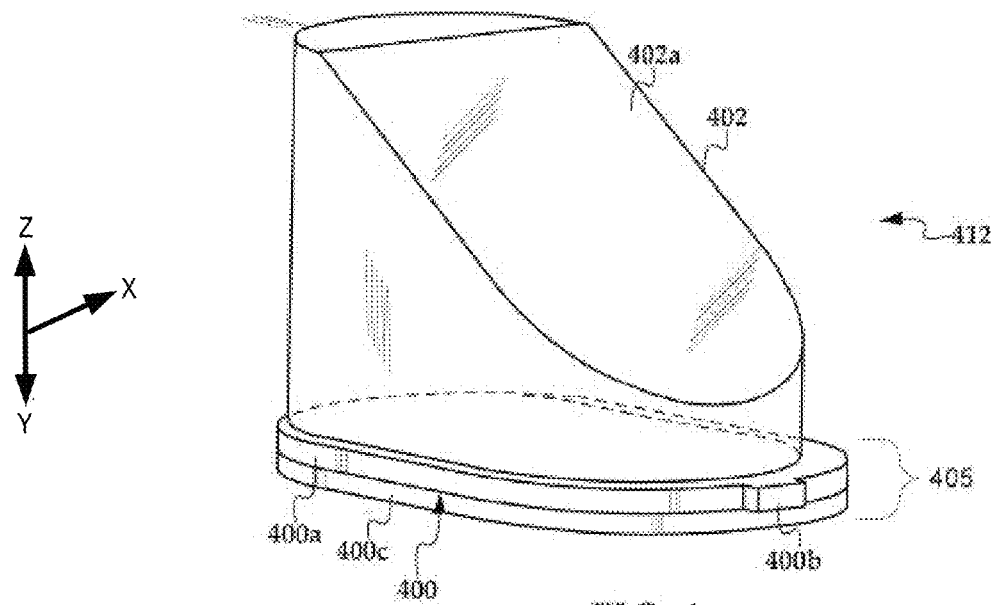
FIG. 4 is a perspective view of a near-field transducer according to an illustrative embodiment.

In FIG. 4, a perspective views show details of a device 412 according to an example embodiment. The device 412 includes a NFT 405 and a heat sink 402 proximate to (e.g., deposited directly on to) the disc 400 of the NFT 405. In this example, the outline of the disc 400 on the xz-plane (which is a substrate-parallel plane) is enlarged relative to the heat sink 402, although they may be the same size. The heat sink 402 includes an angled surface 402a that is located proximate to a write pole (see, e.g., write pole 206 in FIG. 2) or other heat sinking infrastructure.

The disc 400 includes a top disc 400a that acts as a collector of optical energy from a waveguide and/or focusing element. The top disc 400a achieves surface plasmon resonance in response to the optical energy and the surface plasmon energy is directed to the medium via a peg 400b that extends from top portion 400a. In this example, the top portion 400a is configured as an elongated plate with rounded (e.g., circular) ends, also referred to as a stadium or capsule shape. Other enlarged portion geometries may be used, including circular, rectangular, triangular, ellipsoidal, parabolic etc.

The disc 400 also includes a bottom disc 400c. The bottom disc 400c can also be referred to as a sunken disc. The term "sunken disc" refers to a base or bottom portion that extends below the peg, as shown by the base portion 400c in FIG. 3. This can also be described as the peg extending beyond the bottom disc 400c. In some embodiments, such as that depicted in FIG. 4, the bottom disc 400c and the top disc 400a can have the same outline shape (e.g., stadium shape) as well as a same outline size. In some embodiments, the bottom disc 400c and the top disc 400a can have different outline shapes, different outline sizes, or combinations thereof. The peg 400b extends beyond the bottom disc 400c. The bottom portion 400c is disposed proximate a light delivery structure (e.g., a waveguide core) and away from a write pole. In some embodiments, the bottom disc 400c may likely be, but need not be, the primary collector of optical energy.

In FIGS. 5-16, composite views show NFT configurations according to additional embodiments. For purposes of convenience, the write pole and media-facing surface are assigned reference numbers 902 and 900, respectively in all of FIGS. 5-16. In each of FIGS. 5-16, view (a) is a plan view of a substrate-parallel plane of an NFT, heat sink, and write pole 902 near a media-facing surface 900, where the write pole 902 is at the bottom. In these figures, view (b) is a plan view of just the NFT, and view (c) is a side view of an NFT, heat sink, and write pole 902 near a media-facing surface 900. In each case, the size and shape, relative position and material of both the base portions and associated pegs are chosen such that the base portions convert incident photons into plasmons. It should be noted herein that "base portions" can be similar to "discs" as referred to elsewhere in this application. The plasmon is coupled from the base portions to the pegs, the pegs coupling energy into a magnetic storage medium.

In the embodiments of FIGS. 5-16, based portions, pegs, and heatsinks may be made of similar, identical or distinct materials. In particular embodiments, the pegs may be made of a thermally robust and/or chemically robust material described above and the base portions and heat sinks may be made of plasmonic materials. In some cases, the heat sink has high thermal conductivity. Also, in the embodiments shown in FIGS. 5-16 where the peg is embedded in a base portion, the base portions may include recesses that expose a top side of the peg, and the peg may have a thickness that is less than that of the base portion in which the peg is embedded. Any of the embodiments shown in FIGS. 5-16 may also be used with a waveguide (e.g., waveguide core) proximate the base portion(s), and may also include a plasmonic disc that is located on a side of the waveguide that faces away from the base portion(s).

Figure 5:
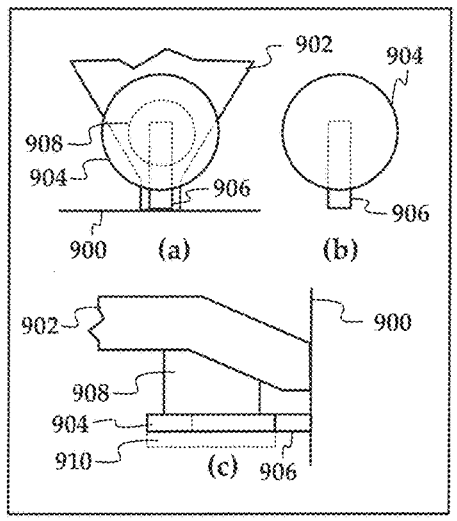
FIGS. 5-16 are each diagrams showing multiple views of near-field transducer arrangements according to additional illustrative embodiments.

In FIG. 5, an NFT includes a disc-style base portion 904 and a peg 906. The peg 906 is rod-shaped and extends to a middle of the base portion 904. The base portion 904 is has a circular contour/outline in this example, although a stadium or other topographically similar shapes may also be used. A heat sink 908 has a contour/outline that follows that of the base portion 904 (circular outline in this example, although could be stadium shaped when used with a stadium-shaped or other topographically similarly shaped base portion) and extends from a major surface of the base portion 904 to the write pole 902. The heat sink 908 has a smaller contour than the base portion 904 in this example, although the heat sink's contour may be the same size as that of the base portion 904 in some embodiments. A lower base portion 910 may optionally be used. The lower base portion 910 extends from a second major surface of the base portion 904 away from the heat sink 902. An outer surface of the lower base portion 910 may be proximate a light delivery structure, e.g., waveguide (not shown).

Figure 6:
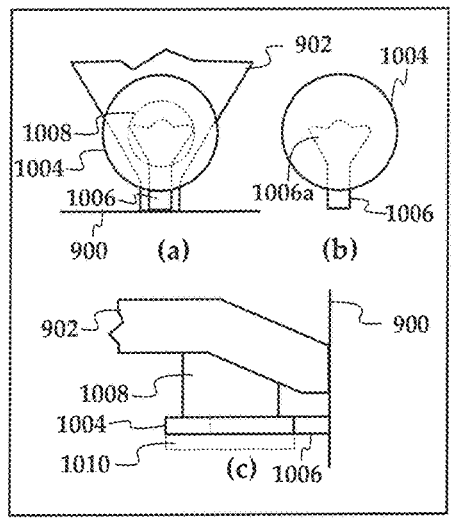

In FIG. 6, an NFT includes a circular disc-shaped base portion 1004 and a peg 1006. The peg 1006 has a flared end 1006a that extends to a middle of the base portion 1004. The flared end 1006a is a geometrical structure that improves adhesion and/or thermal transport and/or plasmonic coupling between the peg 1006 and base portion 1004. A stadium shape may instead be used for the outer contours of the base portion 1004. A heat sink 1008 has a contour that follows that of the base portion 1004 and extends from a major surface of the base portion 1004 to the write pole 902. The heat sink 1008 has a smaller contour than the base portion 1004 in this example, although its contour may be the same size as that of the base portion 1004 in some embodiments. A lower base portion 1010 may optionally be used similar to the lower base portion 910 in the description of FIG. 5.

Figure 7:
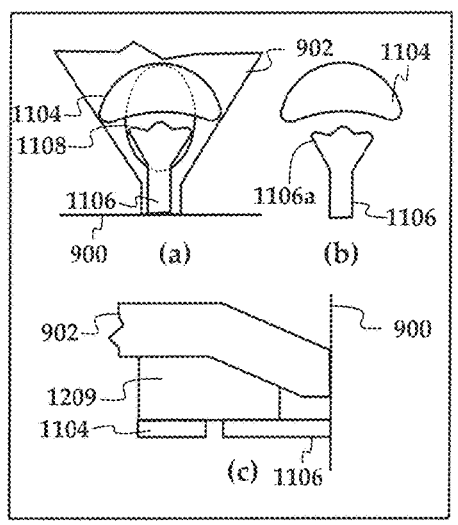

In FIG. 7, an NFT includes a crescent-shaped base portion 1104 and a peg 1106. The base portion 1104 has a crescent shape in this example, although other shapes may be used, e.g. a stadium, rectangle or other topographically similar shapes. The peg 1106 has a flared end 1106a that extends towards the base portion 1104, however the peg 1106 and base portion 1104 are not joined directly together. The flared end 1106a is a geometrical structure that improves plasmonic coupling between the peg 1106 and base portion 1104. A heat sink 1108 joins the base portion 1104, the peg 1106 the write pole 902. The heat sink 1108 has an oval shape in this example, although other shapes may be used, e.g., a shape that follows the contour of the base portion 1104 at one end.

Figure 8:
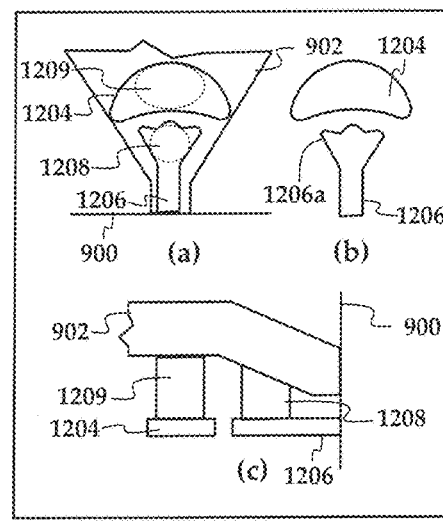

In FIG. 8, an NFT includes a crescent-shaped base portion 1204 and a peg 1206. The base portion 1204 has a crescent shape in this example, although other shapes may be used, e.g. a stadium, rectangle or other topographically similar shapes. The peg 1206 has a flared end 1206a that extends towards the base portion 1204. The peg 1206 and base portion 1204 are not joined directly together. The flared end 1206a is a geometrical structure that improves plasmonic coupling between the rod 1206 and base portion 1204. A first heat sink 1208 joins the peg 1206 to the write pole 902, and second heat sink 1209 joins the base portion 1204 to the write pole 902. The heat sinks 1208, 1209 have oval and round shapes in this example, although other shapes may be used. For the shape of heat sink 1209 may follow that of the base portion 1204.

Figure 9:
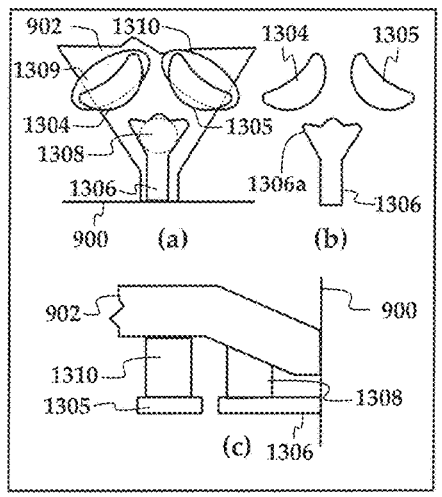

In FIG. 9, an NFT includes two crescent-shaped base portions 1304, 1305 separated by a gap. The base portions 1304, 1305 have a crescent shape in this example, although other shapes may be used, e.g. a stadium, rectangle or other topographically equivalent shapes, designed to enhance the coupling of light from the waveguide (not shown) to the surface plasmon. The peg 1306 has a flared end 1306a that extends towards the gap between the base portions 1304, 1305 however the peg 1306 and base portions 1304, 1305 are not joined directly together. The flared end 1306a is a geometrical structure that improves plasmonic coupling between the rod 1306 and base portions 1304, 1305. A first heat sink 1308 joins the peg 1306 to the write pole 902, and second heat sinks 1309, 1310 join the base portions 1304, 1305 to the write pole 902. The heat sinks 1308-1310 have oval and round shapes in this example, although other shapes may be used. For the shape of heat sinks 1309, 1310 may follow that of the respective base portions 1304, 1305.

Figure 10:
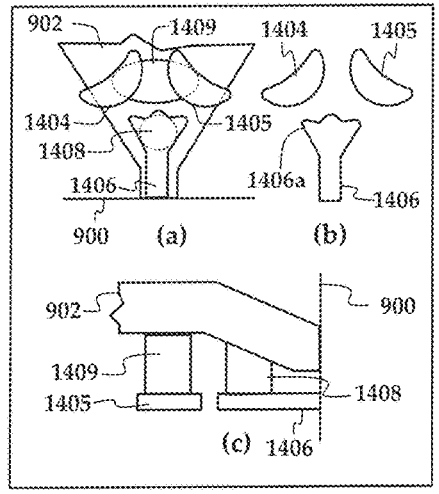

In FIG. 10, an NFT includes two crescent-shaped base portions 1404, 1405 separated by a gap. The base portions 1404, 1405 have a crescent shape in this example, although other shapes may be used, e.g. a stadium, rectangle or other topographically equivalent shapes, designed to enhance the coupling of light from the waveguide (not shown) to the surface plasmon. The peg 1406 has a flared end 1406a that extends towards the gap between the base portions 1404, 1405. The peg 1406 and base portions 1404, 1405 are not joined directly together. The flared end 1406a is a geometrical structure that improves plasmonic coupling between the rod 1406 and base portion 1404. A first heat sink 1408 joins the peg 1406 to the write pole 902, and second heat sink 1409 joins the base portions 1404, 1405 to the write pole 902. The heat sinks 1408, 1409 have oval and round shapes in this example, although other shapes may be used. For the shape of heat sink 1409 may follows that of the base portions 1404, 1405.

Figure 11:
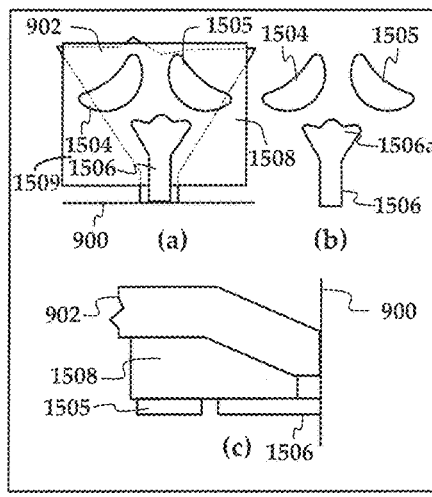

In FIG. 11, an NFT includes two crescent-shaped base portions 1504, 1505 separated by a gap. The base portions 1504, 1505 have a crescent shape in this example, although other shapes may be used, e.g. a stadium, rectangle or other topographically equivalent shapes, designed to enhance the coupling of light from the waveguide (not shown) to the surface plasmon. The peg 1506 has a flared end 1506a that extends towards the gap between the base portions 1504, 1505. The peg 1506 and base portions 1504, 1505 are not joined directly together. The flared end 1506a is a geometrical structure that improves plasmonic coupling between the rod 1506 and base portion 1504. A first heat sink 1508 joins the peg 1506 to the write pole 902, and second heat sink 1509 joins the base portions 1504, 1505 to the write pole 902. The heat sinks 1508, 1509 have oval and round shapes in this example, although other shapes may be used. For the shape of heat sink 1509 may follows that of the base portions 1504, 1505.

Figure 12:
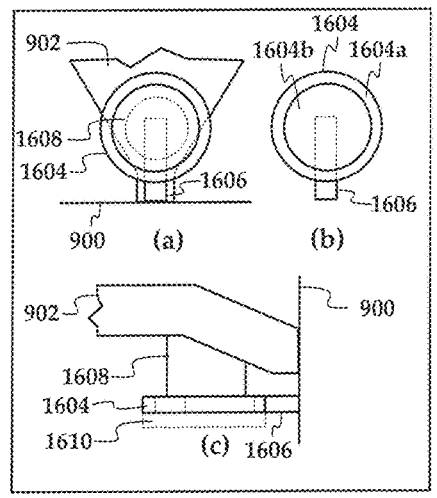

In FIG. 12, an NFT includes a circular disc-shaped base portion 1604 and a peg 1606. The peg 1606 is rod-shaped and extends to a middle of the base portion 1604. The base portion 1604 is has two, concentric sections 1604a-b that are formed of different materials. The sections 1604a-b may be configured to improve any combination of plasmon coupling, heat sinking, adhesion, and diffusion prevention. For example, section 1604a may be formed from a thermally robust material that adheres well to the peg 1606, and section 1604b may be formed from a plasmonic material chosen for efficient plasmonic excitation and coupling. A stadium shape may instead be used for the outer contours of the base portion 1604, as well as the contours of the sections 1604a-b. A heat sink 1608 has a contour that follows that of the base portion 1604 and extends from a major surface of the inner section 1604a of the base portion 1604 to the write pole 902. The heat sink 1608 may be the same size as the outer contours of the base portion 1604 in some embodiments. A lower base portion 1610 may optionally be used. The lower base portion 1610 may cover one or both sections 1604a-b of the base portion 1610.

Figure 13:
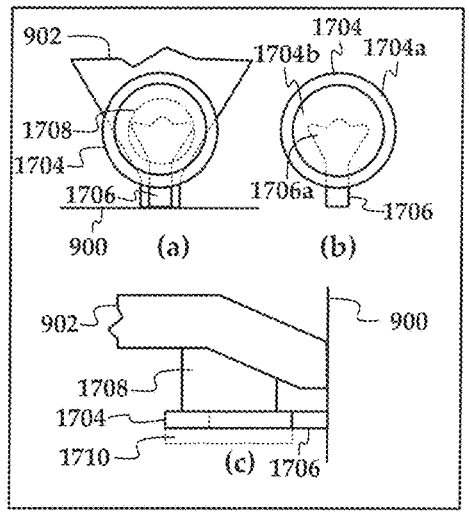

In FIG. 13, an NFT includes a circular disc-shaped base portion 1704 and a peg 1706. The peg 1706 has a flared end 1706a that extends into a center of the base portion 1704. The flared end 1706a is a geometrical structure that may improve adhesion and/or thermal transport and/or plasmonic coupling between the peg 1706 and base portion 1704. The base portion 1704 is has two, concentric sections 1704a-b that are formed of different materials, and may be configured to improve any combination of plasmon coupling, heat sinking, adhesion, and diffusion prevention. A stadium shape may instead be used for the outer contours of the base portion 1704, as well as the contours of the sections 1704a-b. A heat sink 1708 has a contour that follows that of the base portion 1704 and extends from a major surface of the inner section 1704a of the base portion 1704 to the write pole 902. The heat sink 1708 may be the same size as the outer contours of the base portion 1704 in some embodiments. A lower base portion 1710 may optionally be used similar to the lower base portion 910 in the description of FIG. 5. The lower base portion 1710 may cover one or both sections 1704a-b of the base portion 1710.

Figure 14:
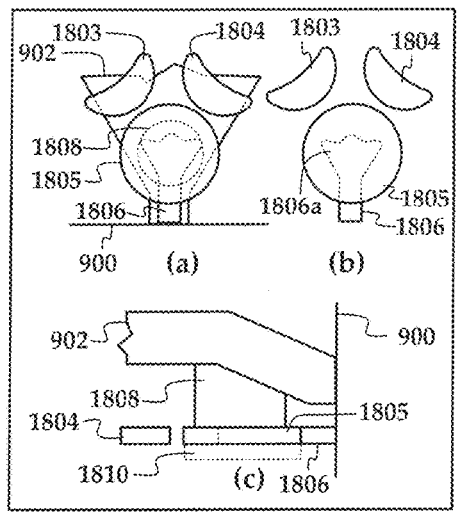

In FIG. 14, an NFT includes multiple base portions 1803-1805 and a peg 1806. The base portions include a disc 1805 (shown circular, but may be stadium-shaped) and two crescent shaped portions 1803, 1804 (shown crescent but may take other shapes) that are not directly connected to either the disc 1805 or the peg 1806. The peg 1806 has a flared end 1806a that extends into a center of the disc-shaped base portion 1805. A heat sink 1808 has a contour that follows that of the base portion 1805 and extends from a major surface of the base portion 1804 to the write pole 902. The heat sink 1808 may be the same size as the outer contours of the base portion 1804 in some embodiments. Optionally, one or both of the crescent shaped portions can be connected to the heat sink 1808. A lower base portion 1810 may optionally be used similar to the lower base portion 910 in the description of FIG. 5. The lower base portion 1810 may cover one or both sections of the base portion 1810.

Figure 15:
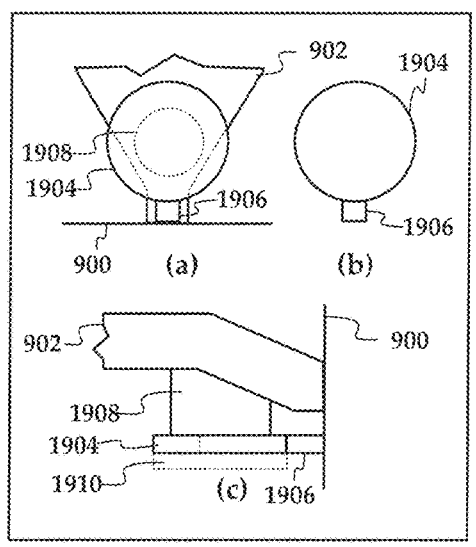

In FIG. 15, an NFT includes a disc-style base portion 1904 and a peg 1906. The peg 1906 is rod-shaped and abuts an edge of the base portion 1904. The base portion 1904 has a circular contour in this example, although a stadium shape may also be used. A heat sink 1908 extends from a major surface of the base portion 1904 to the write pole 902 and may be configured as described in regards to FIG. 5. A lower base portion 1910 may optionally be used as described in regards to FIG. 5.

Figure 16:
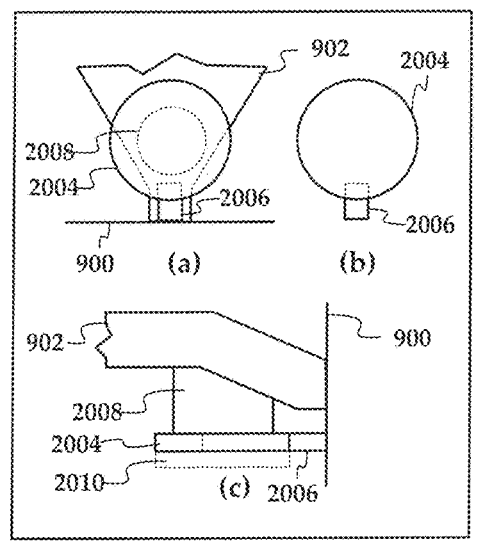

In FIG. 16, an NFT includes a disc-style base portion 2004 and a peg 2006. The peg 2006 is rod-shaped and extends partially into the base portion 2004, e.g., between the center of the base portion 2004 and an edge of the base portion 2004 that faces the recording media. The base portion 2004 has a circular contour in this example, although a stadium shape may also be used. A heat sink 2008 extends from a major surface of the base portion 2004 to the write pole 902 and may be configured as the description of FIG. 5. A lower base portion 2010 may optionally be used as in the description of FIG. 5. The overlap between the peg and the base portion as shown, e.g., in FIGS. 5, 14, and 16 may be chosen to optimize the efficiency, areal density capability and/or reliability of the device. The embodiments of FIGS. 15 and 16 (as well as others) in particular may gain advantage by having the peg made of a thermally robust material and the disc made of a plasmonic material.

Any of the embodiments described above, or combinations of any of the embodiments above may use any combination of disclosed thermally robust material for the peg and disclosed plasmonic material for the other structures (e.g., NFT base portions or discs). Also, combinations of disclosed material may be used in individual components, e.g., layers of different thermally robust materials may form the peg, layers of plasmonic and thermally robust materials may form the peg and/or other (non-peg) parts of the NFT (e.g., the disc or one or more of a multi-layer disc), and layers of different plasmonic materials may be used to form the other (non-peg) parts of the NFT.

In some embodiments, the relationship between the optical properties of the peg material and disc material may be selected to ensure that the size of the optical spot is of a desired size. The optical properties of the peg and disc materials can be described by their "relative permittivity", $\varepsilon$. Where $\varepsilon$ is a material dependent, complex, optical frequency ($\omega$) dependent quantity of the form $\varepsilon(\omega)=\varepsilon_r(\omega)+i\varepsilon_i(\omega)$ that is related to the material refractive index: $\varepsilon_r(\omega)=n(\omega)2-k(\omega)2$, $\varepsilon_i(\omega)=2*n(\omega)*k(\omega)$. The real part of the permittivity, $\varepsilon_r(\omega)$, describes the electric field distribution in the material, and the imaginary part, $\varepsilon_i(\omega)$, describes the amount of energy lost to heating. To excite a plasmon resonance on the disc at a particular incident laser wavelength, either (1) the size and shape of the disc can be chosen to support the resonance, and $\varepsilon_r(\omega)$ of the disc is less than zero; or (2) the $\varepsilon_r(\omega)$ of the material is chosen such that the given size and shape supports a resonance.

Configurations, including size and shape, relative position, materials or combinations thereof in disclosed embodiments can be chosen such that (1) the disc converts incident photons into plasmons; (2) the plasmons are coupled from the disc to the peg; (3) the peg couples energy into the magnetic storage medium. "Disc" as used herein does not imply any prescribed shape or configuration but instead a unit or portion of the NFT that converts energy from photons to plasmons. The disc may include one or more than one pieces. The disc may include more than one piece, more than one material, or both.

The disc may either be in direct contact with the peg where the interface is abutted, overlapping or stitched to the peg, is separated from the peg by some distance, or the more than one piece of the peg may be separated by some distance. The peg may be a rod like structure or it may contain geometrical structures that improve adhesion, plasmonic coupling, or both. The amount of overlap between the peg and the disc, if present may be chosen to advantageously affect efficiency, areal density capability, reliability, or any combination thereof. Excessive, undesirable heating may be prevented or minimized by heat sinking the disc, the peg, or both using one or more heat sink units. The one or more heat sink units may be made of the same or a different material than the peg, the disc or both.

In some embodiments, the imaginary part of the permittivity ($\varepsilon_i(\omega)$) of all materials (peg and disc for example) utilized are kept as small as possible in order to reduce the amount of heating in the device due to plasmon resonance. In some embodiments, the imaginary part of the permittivity could be higher if the thermal, mechanical, or both stabilities were increased to at least partially offset the increase in temperature. In some embodiments the imaginary part of the permittivity can be large so long as the absolute magnitude of the permittivity is large, so as to reduce the total internal field and minimize heating.

In some embodiments, materials of the peg and the disc can be chosen based at least in part, on the real part of the permittivity ($\varepsilon_r(\omega)$) of the materials. For the peg to be able to focus the field into the medium, the real part of the permittivity of the peg material must be approximately equal to, or less than the real part of the permittivity of the disc at the same wavelength. In some embodiments, this implies that the material of the peg has a higher effective carrier concentration than the disc. In some embodiments, the optical criteria for the relationship between the real part of the permittivity of the peg and the disc may be relaxed, for example if there were substantial benefits with respect to reliability. This may be applicable, for example in cases where a potential peg material has a relatively high melting point, a relatively high resistance to oxidation, or both.

The impact of the real and imaginary parts of the permittivity of the peg on the temperature of the peg, cross track erasure (which is related to the size of the optical spot on the magnetic media), or both can be evaluated. FIGS. 17A and 17B show the effect of the real ($\varepsilon_r(\omega)$) and imaginary ($\varepsilon_i(\omega)$) parts of the permittivity of the peg on the peg temperature (FIG. 17A); and cross track erasure (FIG. 17B) assuming a disc that is made of gold (Au). From FIG. 17A, it can be seen that in this configuration, if the peg is made of a material that has a lower effective carrier density than gold (a real permittivity greater than −30), then the temperature of the peg increases (see temperature gradient lines on graph) rapidly as it becomes more difficult to couple energy into the media and the track width becomes larger (FIG. 17B). If the peg is made of a material that has a higher effective carrier density than gold (a real permittivity less than −30) then the peg temperature is reduced (FIG. 17A) and it becomes easier to couple energy into the disc and the track width becomes narrower (FIG. 17B).

In some embodiments, materials for the peg, the disc, the heat sink, other portions of the NFT, or any combinations thereof can include aluminum (Al), antimony (Sb), bismuth (Bi), chromium (Cr), cobalt (Co), copper (Cu), erbium (Er), gadolinium (Gd), gallium (Ga), gold (Au), hafnium (Hf), indium (In), iridium (Ir), iron (Fe), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), tantalum (Ta), tin (Sn), titanium (Ti), vanadium (V), tungsten (W), ytterbium (Yb), yttrium (Y), zirconium (Zr), or combinations thereof. Illustrative examples of materials for the peg, the disc, the heat sink, or any combinations thereof can include binary and/or ternary alloys including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include lanthanides, actinides, or combinations thereof including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include dispersions including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include alloys or intermetallics based on or including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative alloys or intermetallics can include, for example binary and ternary silicides, nitrides, and carbides. For example vanadium silicide (VSi), niobium silicide (NbSi), tantalum silicide (TaSi), titanium silicide (TiSi), palladium silicide (PdSi) for example zirconium nitride (ZrN), aluminum nitride (AlN), tantalum nitride (TaN), hafnium nitride (HfN), titanium nitride (TiN), boron nitride (BN), niobium nitride (NbN), or combinations thereof. Illustrative carbides can include, for example silicon carbide (SiC), aluminum carbide (AlC), boron carbide (BC), zirconium carbide (ZrC), tungsten carbide (WC), titanium carbide (TiC) niobium carbide (NbC), or combinations thereof. Additionally doped oxides can also be utilized. Illustrative doped oxides can include aluminum oxide (AlO), silicon oxide (SiO), titanium oxide (TiO), tantalum oxide (TaO), yttrium oxide (YO), niobium oxide (NbO), cerium oxide (CeO), copper oxide (CuO), tin oxide (SnO), zirconium oxide (ZrO) or combinations thereof. Illustrative examples of materials for the peg, the disc, the heat sink, or any combinations thereof can include conducting oxides, conducting nitrides or combinations thereof of various stoichiometries where one part of the oxide, nitride or carbide includes Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include a metal including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr doped with oxide, carbide or nitride nanoparticles. Illustrative oxide nanoparticles can include, for example, oxides of yttrium (Y), lanthanum (La), barium (Ba), strontium (Sr), erbium (Er), zirconium (Zr), hafnium (Hf), germanium (Ge), silicon (Si), calcium (Ca), aluminum (Al), magnesium (Mg), titanium (Ti), cerium (Ce), tantalum (Ta), tungsten (W), thorium (Th), or combinations thereof. Illustrative nitride nanoparticles can include, for example, nitrides of zirconium (Zr), titanium (Ti), tantalum (Ta), aluminum (Al), boron (B), niobium (Nb), silicon (Si), indium (In), iron (Fe), copper (Cu), tungsten (W), or combinations thereof. Illustrative carbide nanoparticles can include, for example carbides of silicon (Si), aluminum (Al), boron (B), zirconium (Zr), tungsten (W), titanium (Ti), niobium (Nb), or combinations thereof. In some embodiments nanoparticles can include combinations of oxides, nitrides, or carbides. It is to be understood that lists of combinations of elements are not exclusive to monoatomic binary combinations, for example VSi is taken to include $V_2Si$ and $VSi_2$, for example.

The real and imaginary permittivity of an element, alloy, or composition can be determined using methods such as spectroscopic ellipsometry or implied from spectroscopic reflectivity and transmissivity measurements of films of representative thickness. The real and imaginary permittivity of many common materials can be garnered from scientific reports or collations thereof, in some cases a conversion between the refractive index and the permittivity must be completed (the complex permittivity is the square of the complex refractive index $\varepsilon=(n+ik)^2$). For example the permittivity of Au at a wavelength of 830 nm can be determined from the refractive index data compiled in the "Handbook of Optical Constants of Solids" (Ed. Edward D. Palik, Academic Press 1985), the disclosure of which is incorporated herein by reference thereto, where the value given is at a wavelength of 826.6 nm and the complex refractive index is (0.188+5.39 i). The complex permittivity is then $(0.188+5.39 i)^2$ or (−29.0+2.0 i).

TABLE 1

Refractive indices and permittivities from "Handbook of Optical Constants of Solids" (Ed. Edward D. Palik, Academic Press 1985)

| Material | Wavelength (nm) | Refractive Index | | Permittivity | | |
|---|---|---|---|---|---|---|
| | | n | k | Real | Imaginary | Absolute |
| Au | 826.6 | 0.188 | 5.39 | −29.0 | 2.0 | 29.1 |
| Ni | 826.6 | 2.53 | 4.47 | −13.6 | 22.6 | 26.4 |
| Al | 826.6 | 2.74 | 8.31 | −61.5 | 45.5 | 76.6 |
| Ag | 826.6 | 0.145 | 5.5 | −30.2 | 1.6 | 30.3 |
| Cu | 826.6 | 0.26 | 5.26 | −27.6 | 2.7 | 27.7 |
| Ir | 826.6 | 2.65 | 5.39 | −22.0 | 28.6 | 36.1 |
| Rh | 826.6 | 2.78 | 6.97 | −40.9 | 38.8 | 56.3 |
| Pt | 826.6 | 2.92 | 5.07 | −17.2 | 29.6 | 34.2 |
| Os | 826.5 | 2.84 | 1.8 | 4.8 | 10.2 | 11.3 |

In some embodiments, a disc can be made of one of the illustrative materials discussed above having a first real permittivity $(\varepsilon_r(\omega)^1)$ and a peg can be made of one of the illustrative materials discussed above that has a second real permittivity $((\varepsilon_r(\omega)^2)$ where the second real permittivity $((\varepsilon_r(\omega)^2)$ is not greater than (or is less than or equal to) the first real permittivity $(\varepsilon_r(\omega)^1)$. In some embodiments, a peg can be made of a material having a real permittivity $(\varepsilon_r(\omega)^2)$ that is not greater than (or is less than or equal to) −30 for example Ag, Rh, Al, Ir.

In some embodiments, a disc can be made of Cu, Ag, Al, AlTi, ZrN, TiN, Ta and a peg can be made of Au, Ag, Cu, ZrN, Ta, AlTi, Pd, Pt, Ni, Co, Ir, Rh, Al, alloys thereof, or combinations thereof, with the caveat that the disc and the peg are not made of the same material. In some embodiments, the disc does not include gold or any alloy or material including gold. In some embodiments, a peg can be made of Rh, Al, Ir, Ag, Cu, Pd, Pt, alloys thereof, or combinations thereof. In some embodiments, a peg can include Rh or Ir. In some embodiments a peg can include Rh. In some embodiments, a peg can be made of an Au, Rh, Ir ternary alloy or a Rh, Ir, Pd ternary alloy. In some embodiments a peg can be made of an intermetallic containing one of Rh or Ir and one of Ti or Zr or Hf or V or Nb or Ta In some embodiments, materials that have a real permittivity less than −10 (at a wavelength of 830 nm) can be used as a peg material. In some embodiments, materials with either (exclusively either) low imaginary permittivity, or very large absolute real and very large absolute imaginary permittivity can be utilized for the peg material. In the case of low imaginary permittivity, imaginary permittivity may be traded for mechanical robustness. For example, silver has imaginary permittivity <1, indicating very low loss, but is not mechanically or thermally robust, nor resistant to corrosion, whereas ZrN and Ta are mechanically robust and have imaginary permittivity less than 15. Materials with large absolute real permittivity and large imaginary permittivity may also be advantageous as peg materials as they suffer less from heating. Illustrative examples can include Al, Rh, NiFe, AlTi and Ir. In some embodiments, materials that are hard, mechanically robust, resistant to oxidation, have high melting temperature, large absolute permittivity, or combinations thereof may be utilized. Illustrative examples can include Rh and Ir.

In some embodiments, a disc can be made of one of the illustrative materials discussed above having a first real permittivity $(\varepsilon_r(\omega)^1)$ and a peg can be made of one of the illustrative materials discussed above that has a second real permittivity $((\varepsilon_r(\omega)^2)$ where the second real permittivity $((\varepsilon_r(\omega)^2)$ is not greater than and within 50% of the first real permittivity $(\varepsilon_r(\omega)^1)$. In some embodiments the material of the peg also has a relatively high thermal stability and resistance to oxidation. In some embodiments the material of the peg also has a relatively high thermal stability and resistance to oxidation, for example Rh or Ir but not Ni In some embodiments, a disc can be made of one of the illustrative materials discussed above and a peg can be made of a material having a relatively high melting point. In some illustrative embodiments, materials with high melting points can include those having a melting point of not less than (or even greater than or equal to) 1000° C. In some illustrative embodiments, materials with high melting points can include those having a melting point of not less than (or even greater than or equal to) 1500° C. In some illustrative embodiments, materials with high melting points can include those having a melting point of not less than (or even greater than or equal to) 1800° C. Illustrative materials that are considered to have relatively high melting points can include, for example those in Table 2 below.

TABLE 2

| Element | Melting point (° C.) | Element | Melting point (° C.) |
|---|---|---|---|
| Be | 1278 | Pm | 1080 |
| B | 2300 | Sm | 1072 |
| C | 3550 | Gd | 1311 |
| Si | 1410 | Tb | 1360 |
| Sc | 1539 | Dy | 1409 |
| Ti | 1660 | Ho | 1470 |
| V | 1890 | Er | 1522 |
| Cr | 1857 | Tm | 1545 |
| Mn | 1244 | Lu | 1659 |
| Fe | 1535 | Hf | 2227 |
| Co | 1495 | Ta | 2996 |
| Ni | 1453 | W | 3410 |
| Y | 1523 | Re | 3180 |
| Zr | 1852 | Os | 3045 |
| Nb | 2408 | Jr | 2410 |
| Mo | 2617 | Pt | 1772 |
| Tc | 2172 | Au | 1064 |
| Ru | 2310 | Th | 1750 |
| Rh | 1966 | Cm | 1340 |

TABLE 2-continued

| Element | Melting point (° C.) | Element | Melting point (° C.) |
|---|---|---|---|
| Pd | 1552 | Ac | 1050 |
| Nd | 1010 | Pa | 1600 |

In some embodiments, disclosed NFTs including a disc and a peg made of different materials can also include optional adhesion layers. In some embodiments, the optional adhesion layers can be adjacent one or more surfaces of the peg. Experimental evidence has shown, with respect to rhodium pegs in particular, that the rhodium often gets oxidized during processing and/or formation of the peg itself An overlying adhesion layer would be advantageous both to maintain the peg in the desired location (prevent recession via the adhesive properties of the adhesion layer) and protect the material of the peg (e.g., rhodium) from oxidation during further processing. In some embodiments, the adhesion layer could entirely wrap one or more portions of the NFT or peg portion of the NFT. In some embodiments, the adhesion layer could wrap less than the entire NFT or peg portion.

Possible materials for an adhesion layer can be chosen based at least in part on the ability of the material to maintain a bond with the peg material, the ability of the material to maintain a bond with the adjacent material, or combinations thereof. Typically, the NFT or more specifically the peg, is surrounded by an oxide, therefore in order to determine the ability of a potential material to maintain a bond with the adjacent material, the bond strength of an element (for example) with oxygen (O) can be utilized. Table 3 below shows the bond strength to Rhodium (Rh) as an example, the bond strength to oxygen (O), the oxidation free energy and a figure of merit (FOM) based on these three considerations for various elements. It should be noted that illustrative materials for adhesion layers for use in pegs that are made of materials other than Rh could be chosen, based at least in part, on similar considerations by considering the bond strength of the potential elements to the peg material (instead of the bond strength to Rh as seen in Table 3). Generally, an element with a bond strength to Rh that is at least the same as Rh to Rh, a bond strength to O that is at least the same as the bond strength of Rh to O, or some combination thereof may be useful. Higher FOMs indicate that the element may be advantageous.

TABLE 3

| Element | Bond Strength to Rh (kJ/mol at 298°) | Oxidation Free Energy (kJ/mol) | Bond Strength to O (kJ/mol at 298°) | FOM |
|---|---|---|---|---|
| Au | 232 | | 223 | −1 |
| B | 475 | −750 | 809 | 4 |
| Ba | 259 | −1050 | 562 | 1 |
| C | 580 | −400 | 1076 | 6 |
| Ce | 545 | | 790 | 5 |
| Eu | 238 | | 473 | 0 |
| H | 241 | −350 | 430 | 0 |
| La | 550 | | 798 | 5 |
| O | 405 | | 498 | 2 |
| P | 353 | | 589 | 2 |
| Rh | 235 | −500 | 405 | 0 |
| Sc | 444 | −1100 | 671 | 3 |
| Si | 395 | −800 | 800 | 4 |
| Th | 513 | | 877 | 5 |
| Ti | 390 | −900 | 666 | 4 |
| U | 519 | | 755 | 4 |
| V | 364 | −800 | 637 | 3 |
| Y | 446 | −1100 | 714 | 4 |

Based at least in part on the above considerations, useful materials for adhesion layers may include boron (B), carbon (C), cerium (Ce), lanthanum (La), phosphorus (P), scandium (Sc), silicon (Si), thorium (Th), titanium (Ti), uranium (U), vanadium (V), yttrium (Y), or combinations thereof. In some embodiments, adhesion layers can include yttrium (Y), carbon (C), or combinations thereof.

Disclosed adhesion layers can be located on one or more surfaces of the peg, the disc, or both. In some embodiments, an optional adhesion layer can be located on at least one surface of the peg. In some embodiments, an adhesion layer or layers can be located on at least one or more surfaces of the peg that are adjacent an oxide or oxide containing structure. An example of an oxide containing structure that may be next to the peg includes cladding layers. As such, in some embodiments, an adhesion layer or layers can be located on at least one or more surfaces of the peg that are adjacent one or more cladding layers or structures.

FIG. 18A shows an illustrative embodiment depicting a possible location for an optional adhesion layer. FIG. 18A includes a disc 10, which does not necessarily have to be oval in shape, a peg 12 and an adhesion layer 15. It should also be noted that FIG. 18A illustrates the delineation between the rod 11 and the peg, the portion of the rod 11 which is in front of or not within the disc 10 (this construct applies to all embodiments depicted herein, whether stated or not). Stated another way, the rod 11 includes the peg 12, but the peg 12 does not include the entire rod 11, except in cases where the peg is abutted to the rod and then the peg also includes the entire rod. The embodiment of the device in FIG. 18A includes an adhesion layer 15 that is located around, adjacent to, or on the entire rod 11. Although not depicted in FIG. 18A, because it is a plan view, the adhesion layer 15 can also be located underneath and on top of the rod 11. Stated another way, the adhesion layer 15 in such an embodiment can cover all surfaces of the rod 11, except the air bearing surface (ABS) 9. Such an embodiment can be formed by depositing the material of the adhesion layer before the rod material is deposited (e.g., as a seed layer for example), depositing and forming the rod and then depositing the material of the adhesion layer on the surfaces of the rod 11 as seen in FIG. 18A as well as on the top surface of the rod, before any additional cladding material is deposited around or on the rod. Such all-around adhesion layers may help adhere the peg to the adjacent dielectrics and can prevent or at least minimize diffusion of the peg material into the disc or disc material into the peg.

FIG. 18B illustrates another example of a device including an optional adhesion layer. FIG. 18B includes a disc 10, which does not necessarily have to be oval in shape, a peg 12 and an adhesion layer 16. The adhesion layer 16 in this embodiment is located around, adjacent to, or on the peg 12, but no portion of the remainder of the rod. Although not depicted in FIG. 18B, because it is a plan view, the adhesion layer 16 can also be located underneath and on top of the peg 12. Stated another way, the adhesion layer 16 in such an embodiment can cover all surfaces of the peg 12, except the air bearing surface (ABS). Such an embodiment can be formed by depositing the material of the adhesion layer before the peg material is deposited (e.g., as a seed layer for example), forming the peg and then depositing the material of the adhesion layer after formation of the peg (and in some embodiments part of the disc, e.g., the bottom disc) as well as on the top surface of the peg, before any additional cladding material is deposited around or on the peg. Such configurations may promote adhesion between the peg and the dielectric without disrupting the thermal pathway between the rod and disc.

FIG. 18C illustrates another example of a device including an optional adhesion layer. FIG. 18C includes a disc 10, which does not necessarily have to be oval in shape, a peg 12 and an adhesion layer 17. The adhesion layer 17 in this embodiment is only located at the air bearing surface (ABS) of the peg, which can also be called the front of the peg 12. This type of an adhesion layer can also be referred to as an ABS cap. This adhesion layer could then optionally be further covered or have deposited thereon an overcoat layer. This configuration may have the advantage of promoting adhesion of the peg to the air bearing surface.

FIG. 18D illustrates another example of a device including an optional adhesion layer. FIG. 18D includes a disc 19, which although not visible in FIG. 18D is a two layer disc including a bottom disc and a top disc. This is shown in FIG. 18E, which shows the disc 19 made up of a bottom disc 20 and a top disc 21, delineated by the dashed line. The bottom disc 20 has a larger footprint than does the top disc 21 and the top disc 21 is located entirely within the footprint of the bottom disc 20. The adhesion layer 18 in this illustrated embodiment is located on the exposed outer surface of the bottom disc 20, where the top disc 21 is not covering the bottom disc 20. The adhesion layer 18 is illustrated in this embodiment as also covering the sides of the top disc 21. It should be noted that this portion of the adhesion layer 18 is not necessary and need not be present. Although not depicted in this embodiment, the adhesion layer may also be located underneath the bottom disc 20, e.g., adjacent the bottom surface 22 of the bottom disc 20 (as seen in FIG. 18E). It should also be noted that the illustrated adhesion layer 18 is located adjacent the side surfaces of the peg 12. Such an adhesion layer can be formed by first depositing the material of the adhesion layer (if it is desired to have the adhesion layer adjacent the bottom surface 22 of the bottom disc 20), then depositing and forming the bottom disc, depositing the top disc and then depositing the material of the adhesion layer 18. Adhesion layers such as these may be able to prevent or at least minimize diffusion associated with disc materials that aren't completely dense. In some alternative embodiments, an adhesion layer may alternatively or optionally be located between the bottom disc 20 and the top disc 19. An adhesion layer located between the two discs may serve to limit the volume of under-dense material thereby limiting the size of the holes that may appear upon densification.

Portions of the adhesion layer that may be functioning as a seed layer as well, e.g., will have materials deposited thereof may, but need not be made of materials different than the remaining adhesion layer materials. It should also be noted that any combinations of the above discussed adhesion layer configurations or portions thereof can also be utilized and are considered to have been disclosed herein.

Figure 19A:
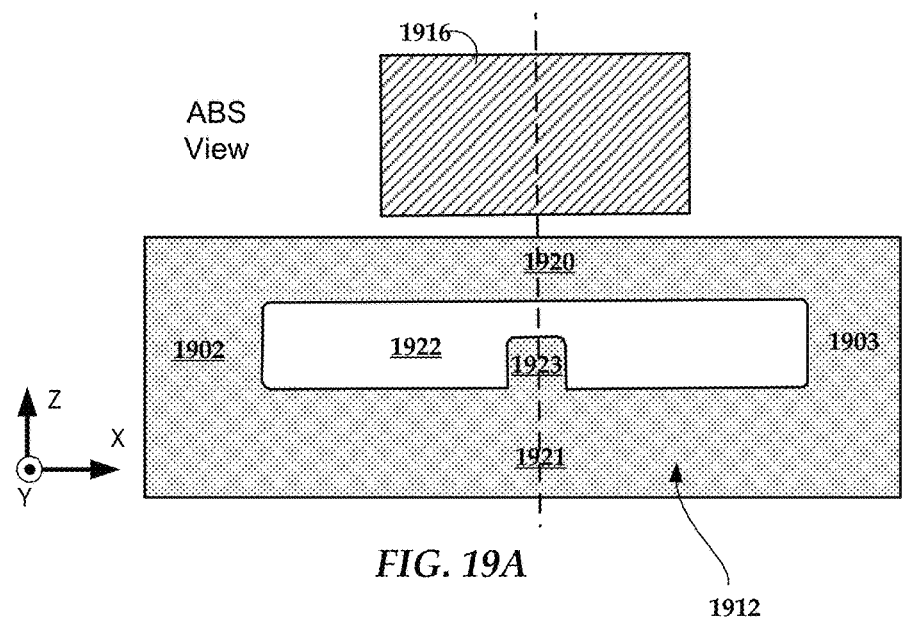
FIGS. 19A-19C show views of an aperture NFT in accordance with embodiments described herein.
Figure 19B:
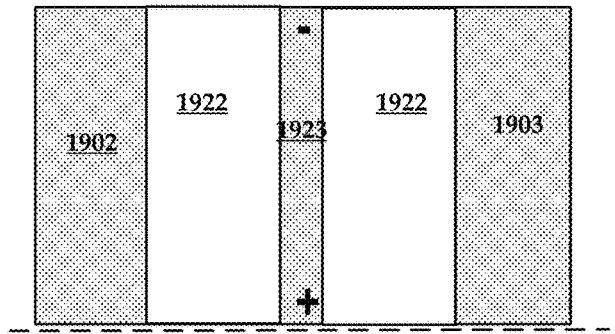
Figure 19C:
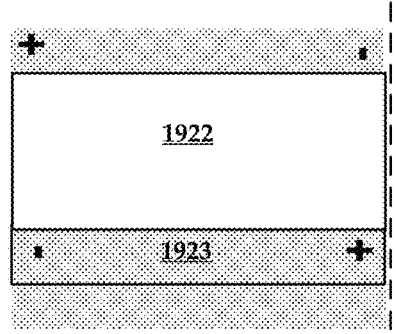
Figure 19D:
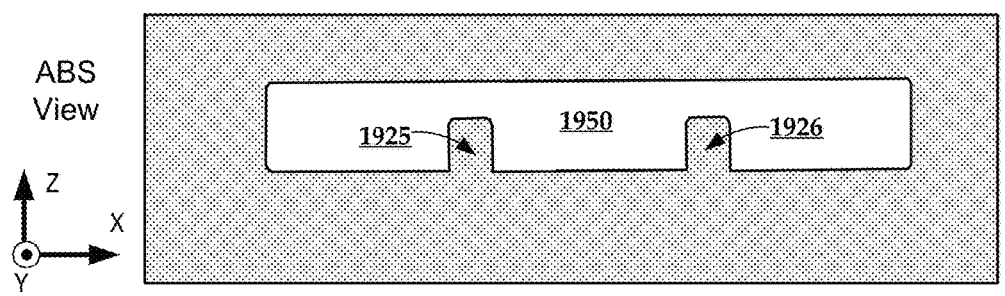
FIGS. 19D and 19E show vies of an aperture NFT having two notches in accordance with embodiments described herein.
Figure 19E:
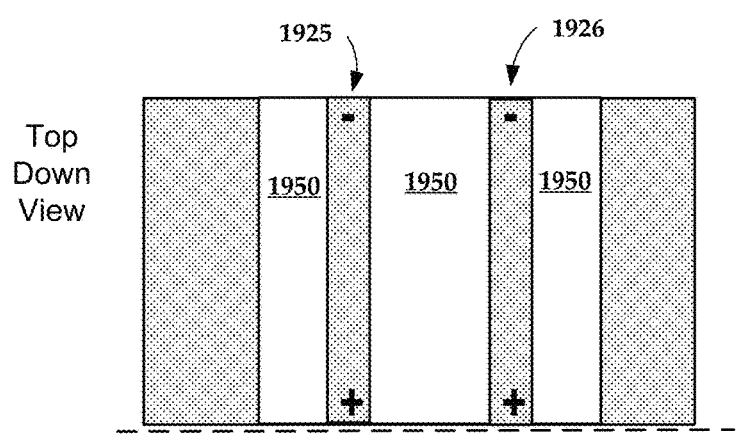

In reference now to FIG. 19A, shows an ABS view of an NFT geometry in accordance with embodiments described herein. The NFT 112 is disposed at a media-facing surface 108 according to an example embodiment. The x-axis in this figure is aligned in a cross-track direction, and the z-axis is aligned in a down-track direction. The aperture 1922 is shown proximate an extension of the write pole 1916. The plasmonic material portion 1920 forms a top wall that separates the aperture 1922 from the write pole 1916. Side portions 1902, 1903 of plasmonic material form side walls surround the aperture 1922 in the cross-track direction. Plasmonic portion 1921 forms a bottom wall of the aperture 1922. These walls are generally parallel to the media-facing surface. Turning now to FIG. 19B, The dashed line represents the media facing surface, the walls in this figure are normal to the media facing surface. Turning now to FIG. 19C, In general, optical fields are directed from a waveguide on the right of 19C toward the ABS (dashed line, 19C) and surface plasmon resonance causes surface plasmons to be directed in this normal direction to a recording media. FIG. 19B shows a top-down view of the device described in FIG. 19A and FIG. 19C illustrates a cross-section view. The NFT shown in FIGS. 19A-19C will be referred to herein as an "aperture" NFT. According to various implementations, an aperture NFT has more than one notch. FIGS. 19D and 19E illustrate an NFT having an aperture 1950 with two notches 1925, 1926.

Figure 20:
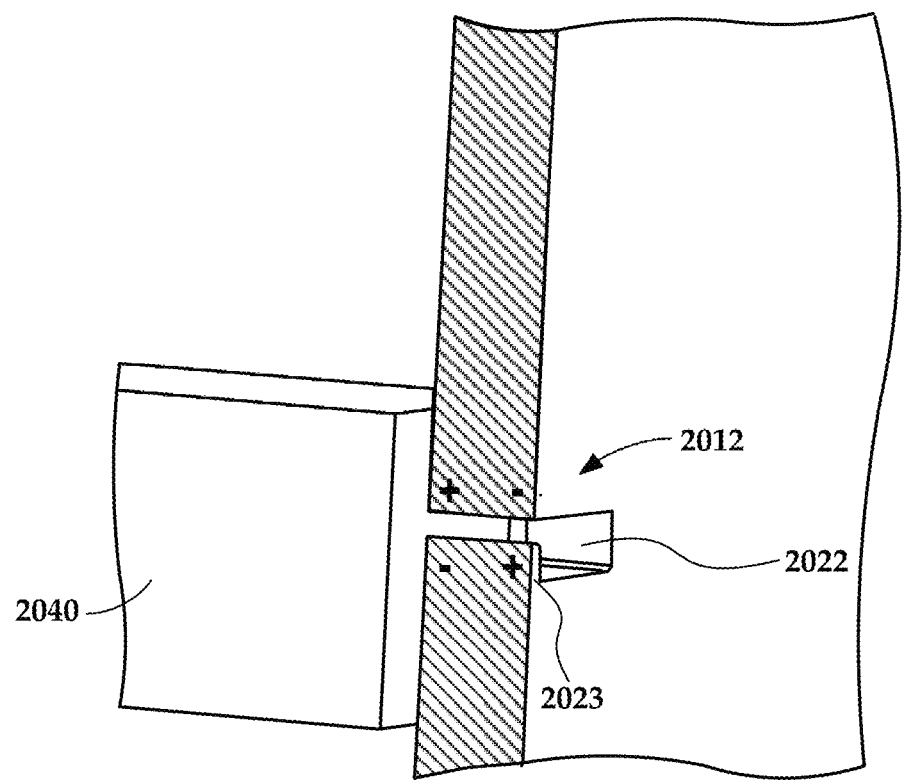
FIG. 20 shows a cross-sectional perspective view shows an aperture NFT in accordance with embodiments described herein.

In FIG. 20, a cross-sectional, perspective view shows details of an NFT 2012 according to an example embodiment. The cross section is taken along a downtrack centerline of a recording head. The NFT 2012 includes a closed aperture 2022 and a notch 2023 protruding therein. A waveguide 2040 delivers energy to the NFT 2012. Omitted in this view is a filler material (e.g., dielectric) in the aperture 2022.

Figure 21A:
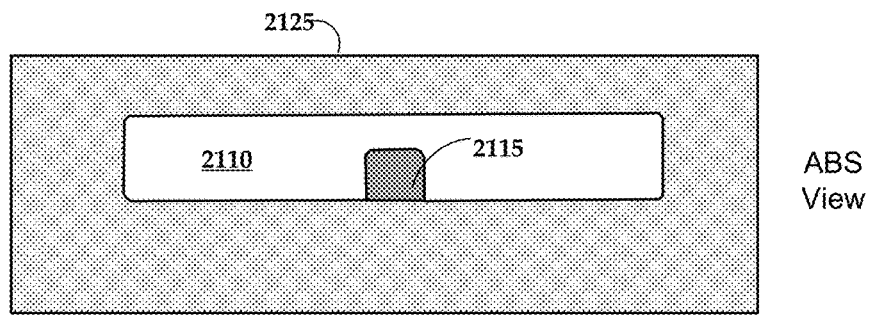
FIGS. 21A-21C illustrate view of an aperture NFT where all or a portion of the notch comprises a mechanically robust material in accordance with embodiments described herein.
Figure 21B:
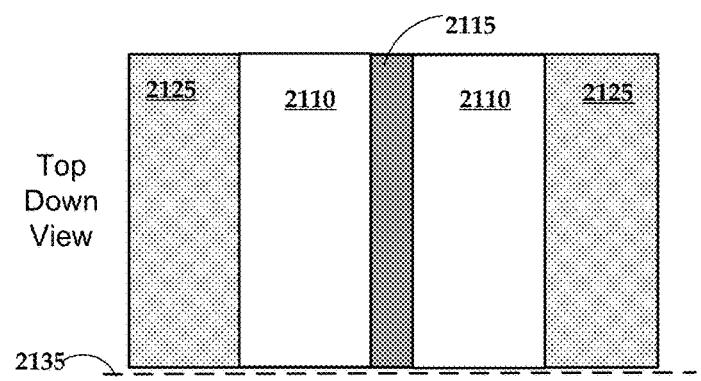
Figure 21C:
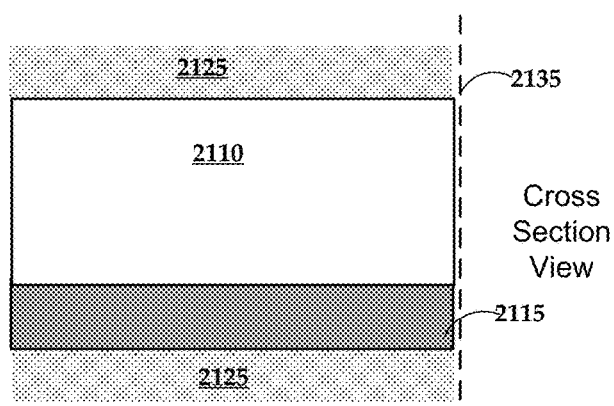

FIGS. 21A-21C illustrates an NFT according to an example embodiment. In this example, all or a portion of the notch 2115 comprises one or more mechanically robust materials. The aperture 2110 and the walls 2125 comprise a material different from the material of the notch. FIG. 21A illustrates a ABS view. FIG. 21B shows a top-down view and FIG. 21C illustrates a cross section. The dotted line 2135 in FIGS. 21A and 21B represents the ABS side.

Figure 22A:
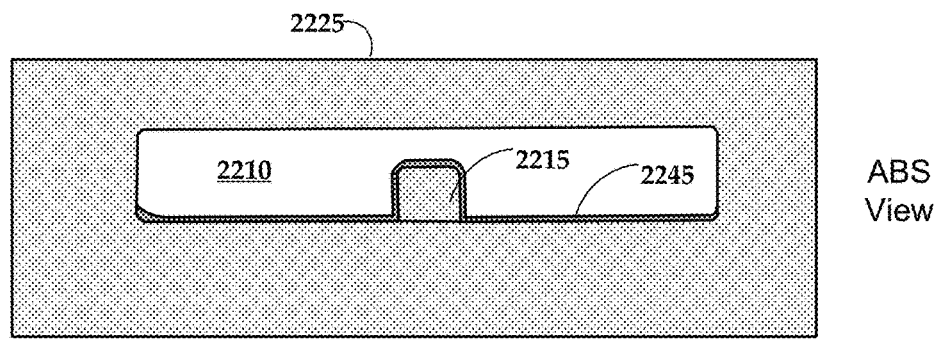
FIGS. 22A-22C illustrate views of an aperture NFT having a coating comprising mechanically robust materials in accordance with embodiments described herein.
Figure 22B:
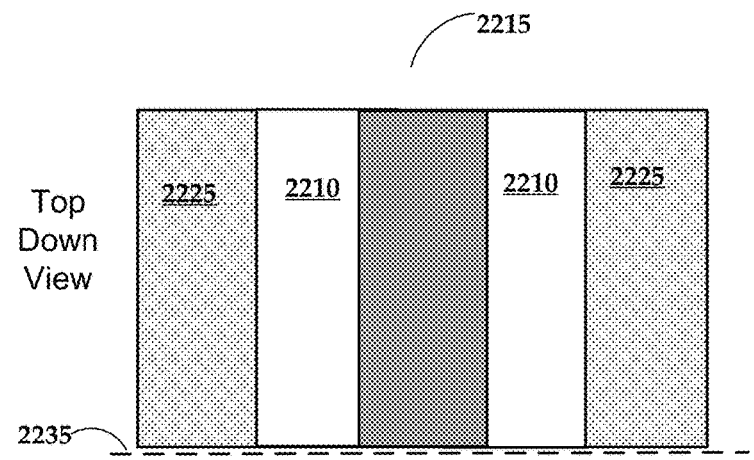
Figure 22C:
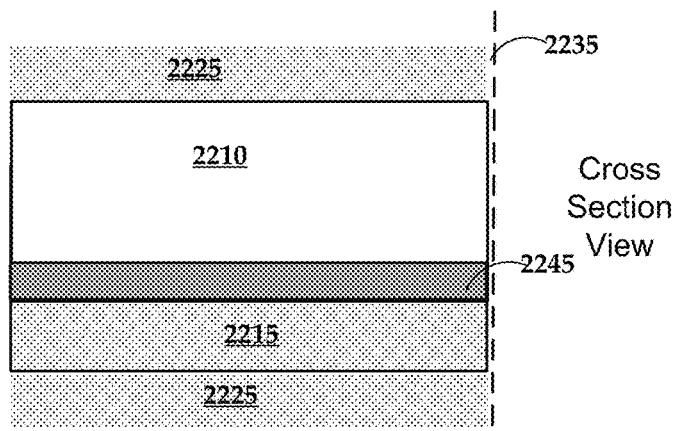

FIGS. 22A-22C illustrates an NFT according to various embodiments. In this example, all or a portion of the notch 2215 and the aperture are coated with a coating 2245 comprising one or more mechanically robust materials. The aperture 2210, the notch 2215, and the walls 2225 comprise a material different from the material of the coating 2245. FIG. 22A illustrates an ABS view. FIG. 22B shows a top-down view and FIG. 22C illustrates a cross section view. While FIGS. 22A-22C illustrate an example in which the notch 2215 and the aperture 2210 are coated with the coating 2245, it is to be understood that only the aperture 2210 or the notch 2215 may be coated with the coating 2245 in some cases. The dotted line 2235 in FIGS. 22A and 22B represents the ABS side.

Figure 23A:
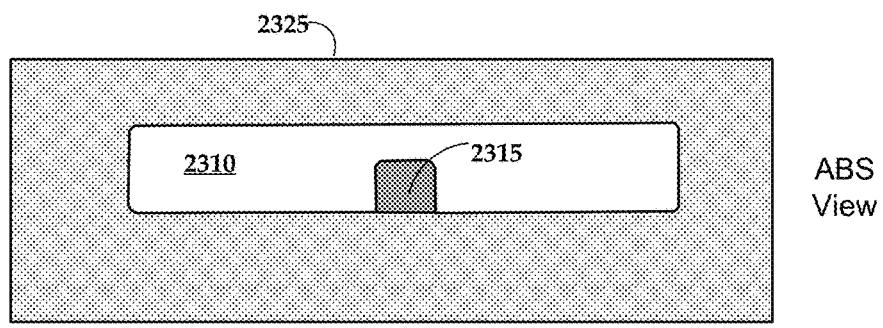
FIGS. 23A-23C illustrate views of an aperture NFT having a first portion comprising a mechanically robust material.
Figure 23B:
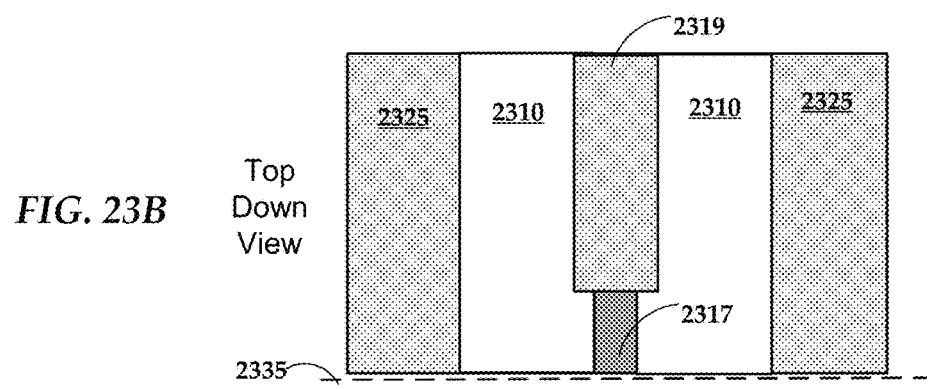
Figure 23C:
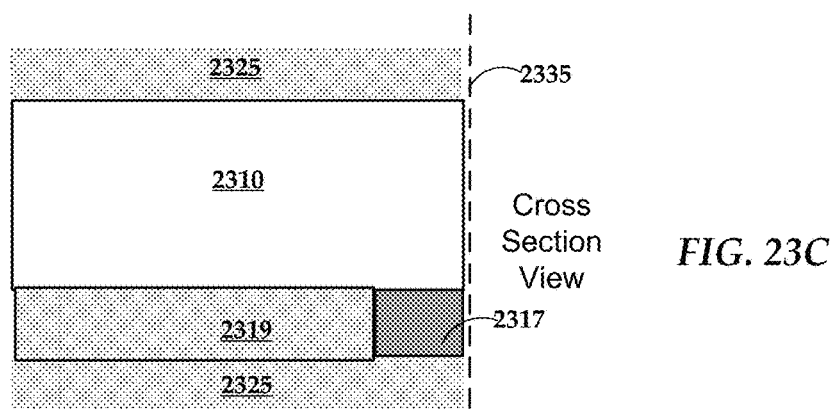

FIGS. 23A-23C illustrates an NFT according to various embodiments. In this example, a first portion 2317 of the notch 2315 closest to the ABS comprises one or more mechanically robust materials. The first portion 2317 is shown in FIGS. 23B and 23C and is proximate the ABS 2335. A second portion 2319 of the notch 2315 further from the ABS comprises a material different from the material of the first portion 2317. The aperture 2310 and the walls 2325 comprise a material different from at least the first portion 2317 of the notch 2315.

Figure 24A:
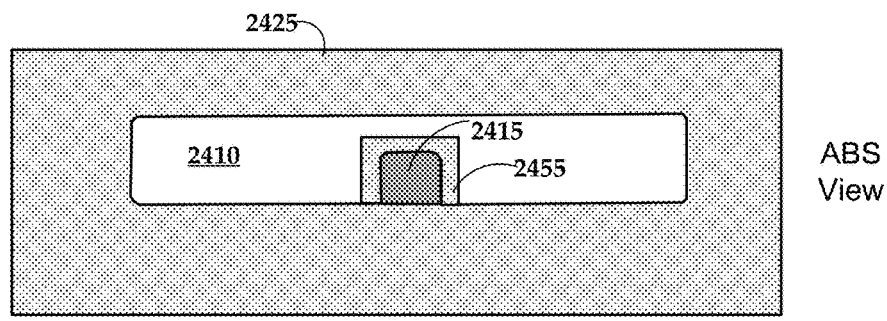
FIGS. 24A-24C illustrate views of an NFT having a notch comprising mechanically robust materials and a coating disposed on the notch in accordance with various embodiments described herein.
Figure 24B:
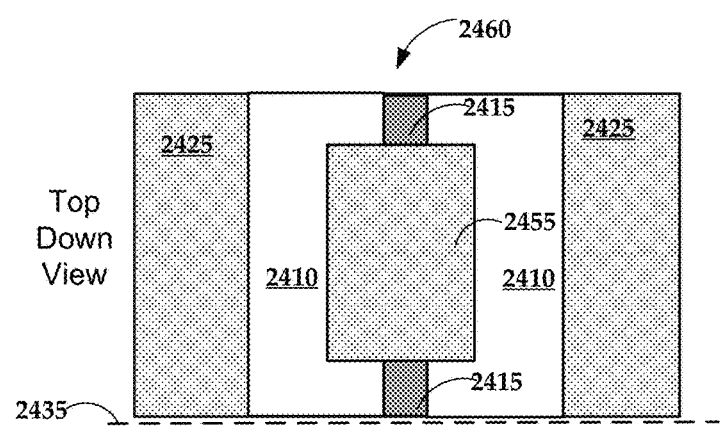
Figure 24C:
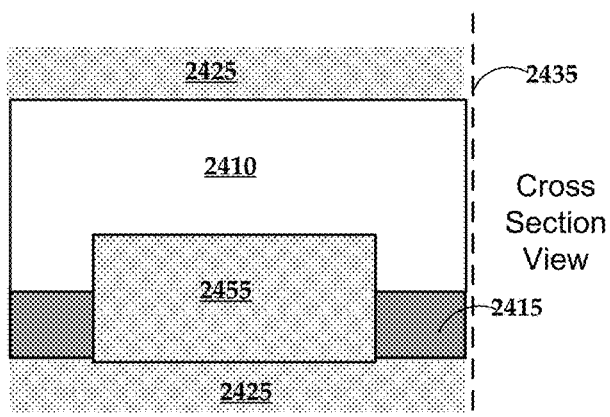

FIGS. 24A-24C illustrates an NFT according to various embodiments. In this example, all or a portion of the notch 2415 comprises one or more mechanically robust materials. A portion of the notch 2415 is coated with a coating 2455. According to various implementations, the coating 2455 comprises the same or similar material as that of the walls 2425. For example, the coating 2455 and the walls 2425 comprise Au. In some cases, the coating 2455 is disposed on the notch except for the one or both of the waveguide-facing surface 2460 and the ABS 2435. As shown in the top-down view of FIG. 24B and the cross-section view of FIG. 24C, the coating is disposed on the notch 2415 except for both of the waveguide-facing surface 2460 and the ABS 2435, According to various configurations, a thickness of the coating is in a range of about 5 nm to 20 nm. According to various configurations, the notch 2415 comprises a different material than that of the walls 2425 and/or the aperture 2410.

Figure 25A:
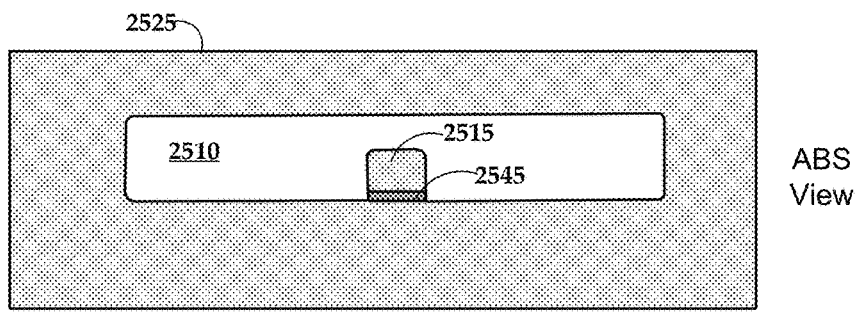
FIGS. 25A-25C illustrate an aperture NFT having a notch coated with a mechanically robust material according to various embodiments.
Figure 25B:
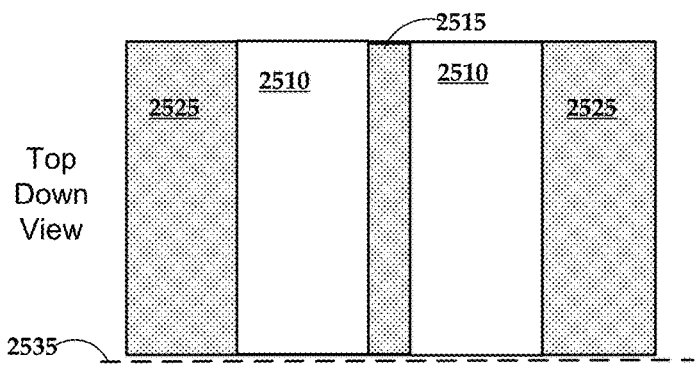
Figure 25C:
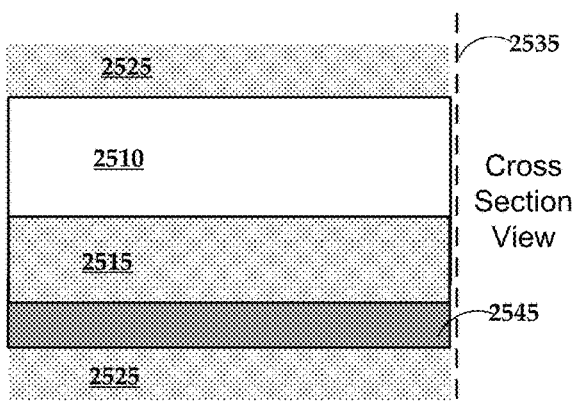

FIGS. 25A-25C illustrates an NFT according to various embodiments. In this example, all or a portion of the notch 2515 is coated with a coating 2545. According to various embodiments, the walls 2525 comprise the same or similar material to that of the notch 2515. The coating 2545 provides a barrier layer between the notch 2515 and the walls 2525. In some cases, the material of the aperture 2510 comprises a different material from that of the notch 2515, the walls 2525, and/or the coating 2545. According to various configurations, a thickness of the coating is in a range of about 0.5 nm to 20 nm. In some configurations, a thickness of the coating is in the range of about 5 nm to 10 nm. FIG. 25B illustrates an top-down view and FIG. 25C illustrates a cross section view The dotted line 2535 in FIGS. 25B and 25C represents the ABS side.

Figure 26A:
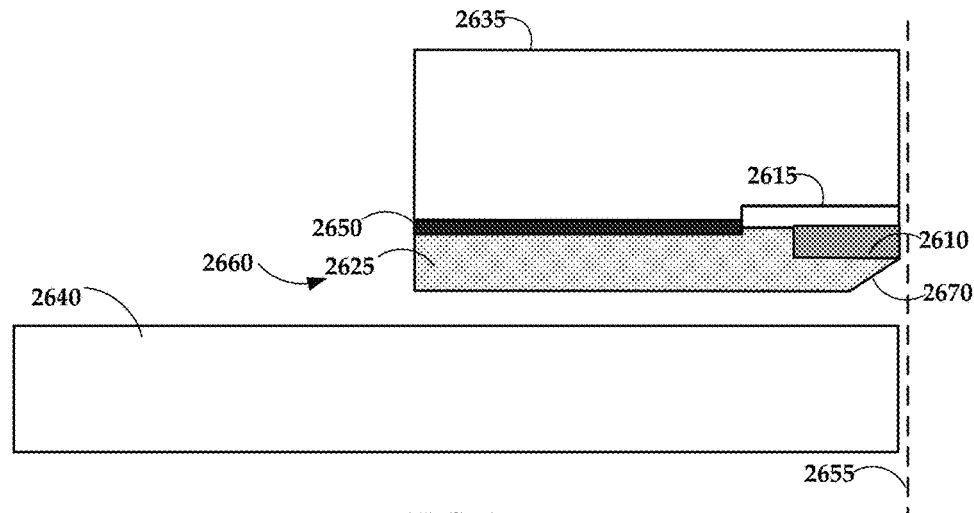
FIGS. 26A-26C illustrate views of a PPG NFT accordance with various embodiments described herein.
Figure 26B:
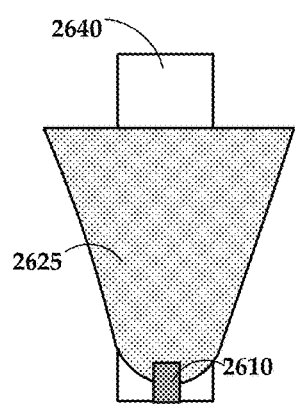

FIGS. 26A and 26B show another NFT geometry. In some instances, the optical delivery path of a HAMR slider may be optically coupled to a planar plasmon antenna NFT 2660 also called a planar plasmon generator (PPG). The planar plasmon antenna 2660 is not only located adjacent to a core of the waveguide 2640 but also can be located adjacent the ABS 2655. The energy source, (e.g., the laser diode) can be used to direct a beam of optical radiation to adjacent the planar plasmon antenna 2660 via the waveguide. The planar plasmon antenna 2660 acts as an optical antenna and is formed of plasmonic metals such as gold, silver, copper, aluminum, etc., and alloys thereof. As a result of the optical delivery path, an optical mode of incident radiation couples to a propagating edge plasmon mode in the planar plasmon antenna. As a result of the propagating edge plasmon mode, optical energy is converted into plasmon energy, which travels along the planar plasmon antenna. The planar plasmon antenna shapes and transmits the energy to a small region on the medium. As a result of the application of energy, a high temperature rise in a small region on the media, with the region exceeding the Curie temperature having dimensions less than 100 nm occurs. This also results in high temperature rise in the slider near the planar plasmon antenna due to optical losses in the delivery path.

Figure 26C:
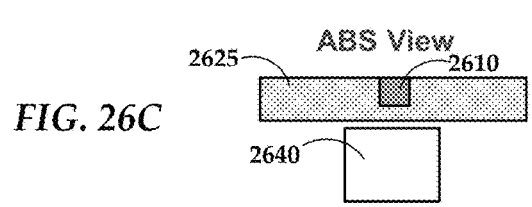

FIG. 26A illustrates a slider having a PPG NFT 2660 that includes an enlarged region 2625 and a peg region 2610 proximate the ABS 2655. The enlarged region 2625 may be referred to herein as the NFT body. According to various implementations, at least a portion of the PPG NFT 2660 comprises a mechanically robust material. For example, all or a portion of the peg region 2610 may comprise a mechanically robust material. According to various embodiments, the peg region 2610 and the enlarged region 2625 comprise different materials. In some cases, the peg 2610 comprises an oxidation resistant barrier layer (not shown) that coats all or a portion of the peg region 2610. The enlarged region 2625 has a slope 2670 on a side of the enlarged region 2625 that faces the ABS 2655. A dielectric spacer 2615 may be disposed between the peg region 2610 and a magnetic pole 2635. In some cases, the dielectric spacer is additionally or alternatively disposed between at least a portion of the enlarged region 2625 and the magnetic pole 2635. Optionally, a diffusion barrier 2650 is disposed between at least a portion of the enlarged region 2625 and the magnetic pole 2635. The diffusion barrier 2650 may be configured to prevent the mechanically robust material from oxidizing. In some cases, the diffusion barrier 2650 is configured to prevent the magnetic pole 2635 and the enlarged region 2625 from interdiffusing. FIG. 26B illustrates a top-down view of the PPG NFT described in FIG. 26A. The PPG NFT includes an enlarged region 2625 and a peg region 2610 and is disposed proximate a waveguide core 2640. FIG. 26C illustrates the ABS view of the enlarged region 2625, the peg region 2610 and the waveguide core 2640.

Figure 27A:
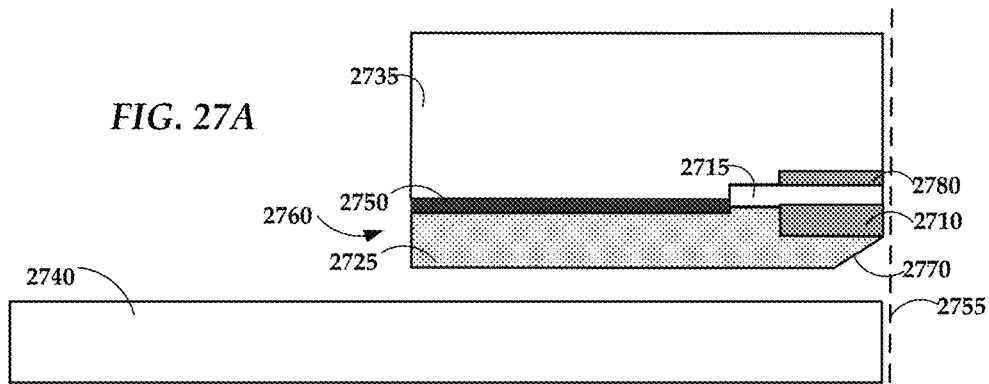
FIGS. 27A, 27B, and 28 illustrate embodiments of a PPG NFT having a peg comprising a mechanically robust material.

FIG. 27A illustrates a slider configuration having a PPG NFT 2760 that includes an enlarged region 2725 and a peg region 2710 proximate the ABS 2755. According to various implementations, at least a portion of the PPG NFT 2760 comprises a mechanically robust material. For example, all or a portion of the peg region 2710 may comprise a mechanically robust material. The enlarged region 2725 has a slope 2770 on a side of the enlarged region 2725 that faces the ABS 2755. A peg coupler 2780 is disposed between the magnetic pole 2735 and the peg 2710. According to various implementations, the peg coupler 2780 comprises a same or similar material as the peg 2710. For example, the peg coupler 2780 may comprise a mechanically robust material such as Rh or Ir. In some cases, the peg coupler 2780 comprises a plasmonic material such as Au or Ag. According to various implementations, the peg 2710 is separated from the peg coupler 2780 by a dielectric spacer 2715 disposed between the peg region 2710 and a magnetic pole 2735. In some cases, the dielectric spacer 2715 is additionally or alternatively disposed between at least a portion of the enlarged region 2725 and the magnetic pole 2735. Optionally, a diffusion barrier 2750 is disposed between at least a portion of the enlarged region 2725 and the magnetic pole 2735. The diffusion barrier 2750 may be configured to prevent the mechanically robust material from oxidizing. In some cases, the diffusion barrier 2750 is configured to prevent the magnetic pole 2735 and the enlarged region 2725 from interdiffusing.

Figure 27B:
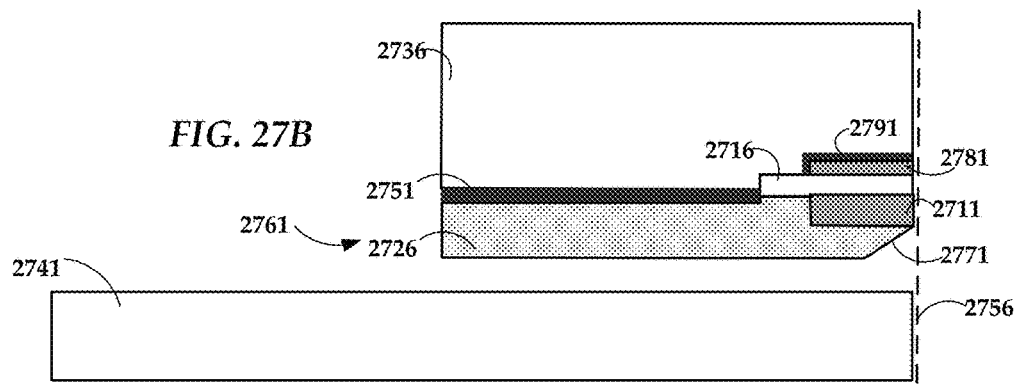

FIG. 27B illustrates a slider configuration having a PPG NFT 2761 that includes an enlarged region 2726 and a peg region 2711 proximate the ABS 2756. Similarly to FIG. 27A, at least a portion of the PPG NFT 2761 comprises a mechanically robust material. For example, all or a portion of the peg region 2711 may comprise a mechanically robust material. The enlarged region 2726 has a slope 2771 on a side of the enlarged region 2726 that faces the ABS 2756. A peg coupler 2781 is disposed between the magnetic pole 2736 and the peg 2711. According to various implementations, the peg 2711 is separated from the peg coupler by a dielectric spacer 2716 disposed between the peg region 2711 and a magnetic pole 2736. In some cases, the dielectric spacer 2716 is additionally or alternatively disposed between at least a portion of the enlarged region 2726 and the magnetic pole 2736. A first diffusion barrier 2791 is disposed between the peg coupler 2781 and the magnetic pole 2736. According to various embodiments, the first diffusion barrier 2791 is configured to prevent the magnetic pole 2736 and the peg coupler 2781 from interdiffusing. Optionally, a second diffusion barrier 2751 is disposed between at least a portion of the enlarged region 2726 and the magnetic pole 2736. In some cases, the second diffusion barrier 2751 is configured to prevent the magnetic pole 2736 and the enlarged region 2726 from interdiffusing.

Figure 28:
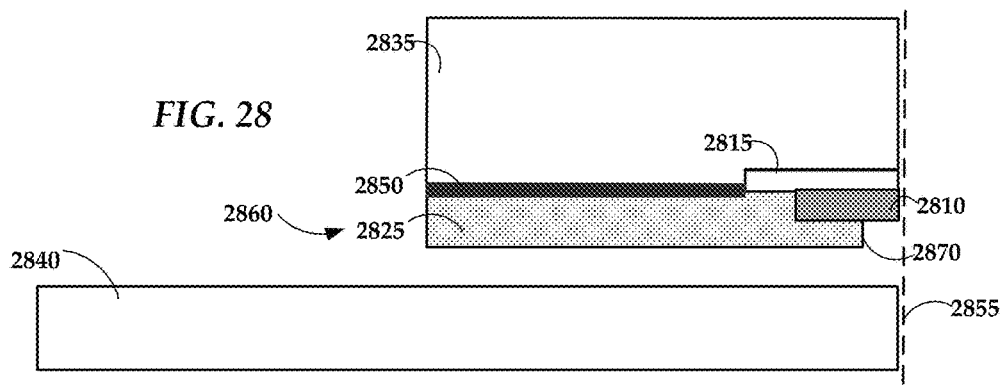

FIG. 28 illustrates a slider configuration having a PPG NFT 2860 that includes an enlarged region 2825 and a peg region 2810 proximate the ABS 2855. According to various implementations, at least a portion of the PPG NFT 2860 comprises a mechanically robust material. For example, all or a portion of the peg region 2810 may comprise a mechanically robust material. The enlarged region 2825 has a step 2870 on a side of the enlarged region 2825 that faces the ABS 2855. According to various implementations, the peg 2810 is separated from a magnetic pole 2835 by a dielectric spacer 2815 disposed between the peg region 2810 and a magnetic pole 2835. In some cases, the dielectric spacer 2815 is additionally or alternatively disposed between at least a portion of the enlarged region 2825 and the magnetic pole 2835. Optionally, a diffusion barrier 2850 is disposed between at least a portion of the enlarged region 2825 and the magnetic pole 2835. The diffusion barrier 2850 may be configured to prevent the mechanically robust material from oxidizing. In some cases, the diffusion barrier 2850 is configured to prevent the magnetic pole 2835 and the enlarged region 2825 from interdiffusing. While FIG. 28 does not show a peg coupler as described in FIGS. 27A and 27B, it is to be understood that the system of FIG. 28 may also include a peg coupler. In some cases, the system of FIG. 28 also includes a diffusion barrier between the peg coupler and the magnetic pole.

Figure 29A:
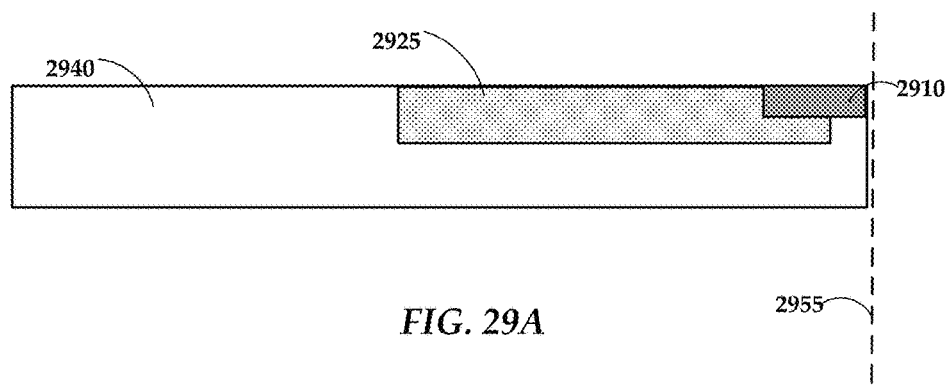
FIGS. 29A-29C illustrate a PPG NFT system for use with TE propagating light in accordance with embodiments described herein.
Figure 29B:
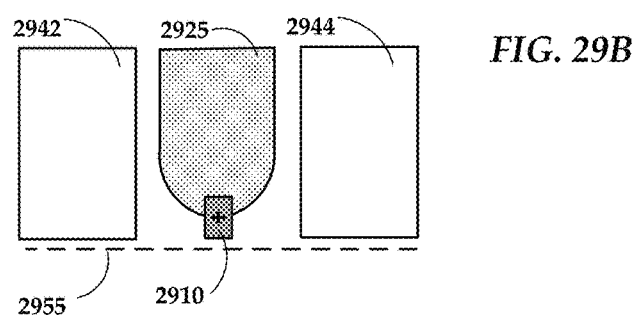
Figure 29C:

While FIGS. 26A-28 show a PPG system configured for use with TM propagating light, the system may be configured to work with TE propagating light. In A TE system, the waveguide is in a different location. FIGS. 29A-29C illustrate a PPG system for use with TE propagating light. FIG. 29A illustrates a slider having a PPG NFT that includes an enlarged region 2925 and a peg region 2910 proximate the ABS 2955. According to various implementations, at least a portion of the PPG NFT comprises a mechanically robust material. For example, all or a portion of the peg region 2910 may comprise a mechanically robust material. According to various embodiments, the peg region 2910 and the enlarged region 2925 comprise different materials. FIG. 29B illustrates a top-down view of the PPG NFT described in FIG. 29A. The PPG NFT includes an enlarged region 2925 and a peg region 2910 and is disposed proximate two sides of a waveguide core 2942, 2944. FIG. 29C illustrates the ABS view of the enlarged region 2925, the peg region 2910 and the sides of the waveguide core 2942, 2944.

Figure 30A:
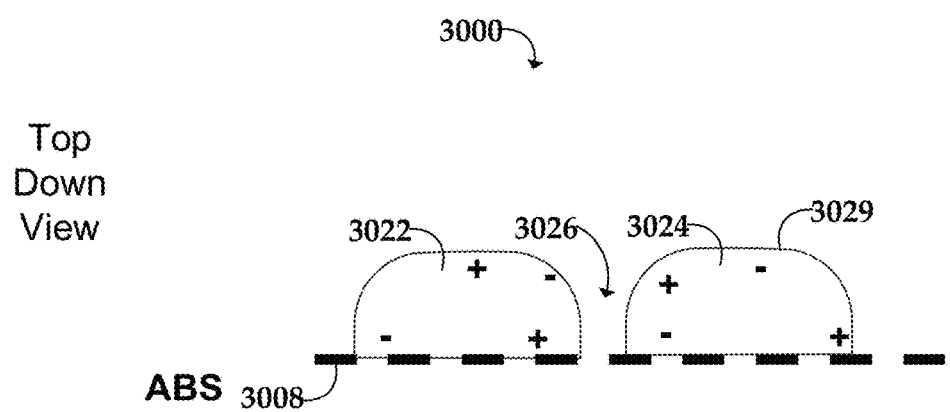
FIGS. 30A and 30B show views of a gap NFT in accordance with embodiments described herein.
Figure 30B:
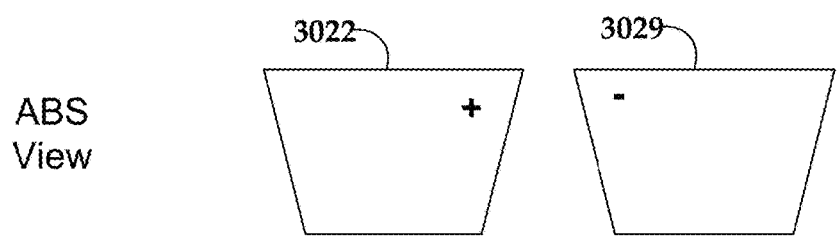

FIGS. 30A and 30B show another NFT geometry. This NFT 3000 is configured as side-by-side, elongated plates 3022, 3024 (elongated in the y-direction) with a gap 3026 therebetween. The plates 3022, 3024 are disposed on the x-y plane, and the gap 3026 runs in the y-direction from an excitation location to the ABS 3008. The gap 3026 and surrounding areas may be filled with a dielectric material. The plates 3022, 3024 are curved/chamfered at waveguide facing ends 3029 in order to improve coupling with a waveguide (not shown). FIG. 30B illustrates an ABS view of the NFT 3000. This arrangement may be referred to herein as the "gap" NFT.

Figure 31A:
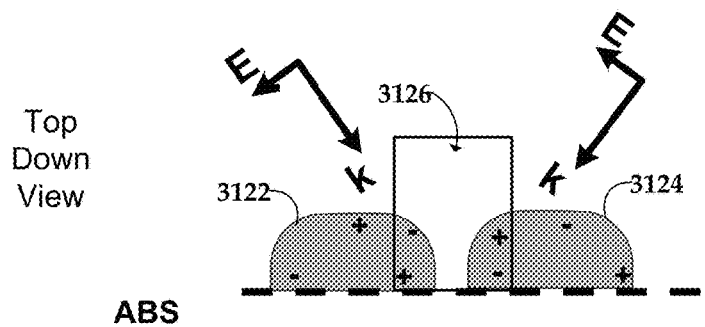
FIGS. 31A-31C illustrate views of a gap NFT having an inner core portion made from a mechanically robust material in accordance with embodiments described herein.
Figure 31B:
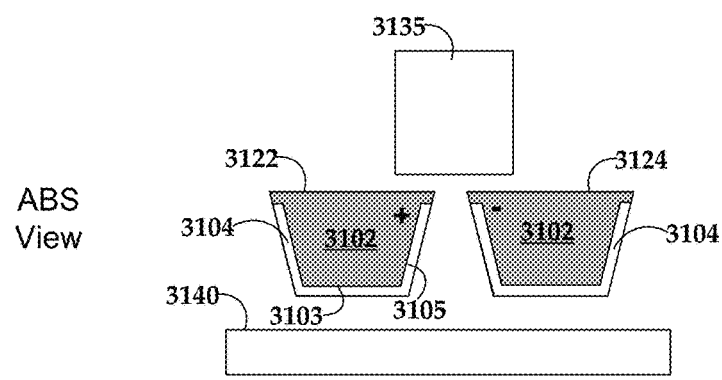
Figure 31C:
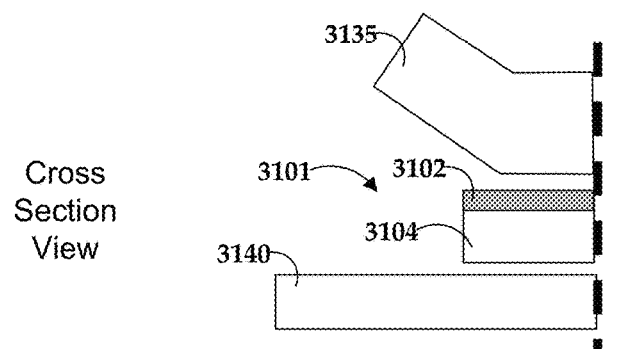

In the embodiment of FIGS. 31A-31C, an inner core portion of the NFT is made from a mechanically robust material 3102, such as Rh or Ir, that is coated by a plasmonic material 3104. The top-down view shown in FIG. 31A illustrates the NFT as side-by-side, elongated plates 3122, 3124 with a gap 3126 therebetween. At least a portion of the plates 3122, 3124 comprises the mechanically robust material. The core portion has at least two adjacent non-parallel surfaces 3103, 3105. The outer conformal layer of plasmonic material 3104 encompasses the at least two surfaces 3103, 3105 as shown in FIG. 31B. The core may be formed of a non-magnetic material 3102 of low-solubility in the plasmonic material 3104. In such a case, the non-magnetic material 3102 provides the NFT higher mechanical stability than the plasmonic material 3104. FIG. 31C illustrates a cross-section view of the gap NFT shown in FIGS. 31A and 31B. The inner core portion of the NFT is comprises a mechanically robust material 3102 and at least a portion of the outer layer of the NFT 3101 comprises a plasmonic material 3104. A write pole 3135 is disposed proximate to a side of the NFT 3101 having the mechanically robust material 3102. A waveguide 3140 at least partially encompasses the plasmonic material 3104 of the NFT 3101.

Figure 32A:
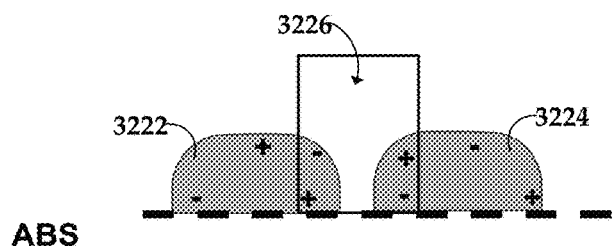
FIGS. 32A-32C show views of a gap NFT having a top surface made from a mechanically robust material in accordance with embodiments described herein.
Figure 32B:
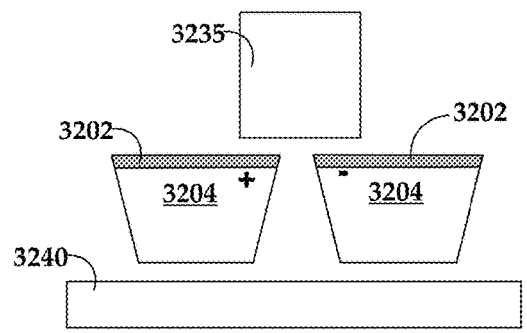
Figure 32C:
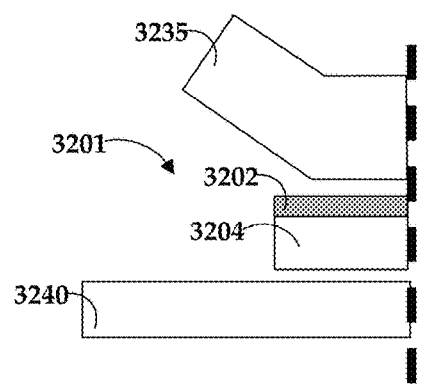

In the embodiment of FIGS. 32A-32C, a top surface of the NFT is made from a mechanically robust material 3202 and the rest of the plates include a plasmonic material 3204. The top-down view shown in FIG. 32A illustrates the NFT as side-by-side, elongated plates 3222, 3224 with a gap 3226 therebetween. FIG. 32B illustrates an ABS view of the gap NFT of FIG. 32A. From the view of FIG. 32B, it can be observed that the surface of the NFT facing the write pole 3235 comprises the mechanically robust material 3202 and the bottom portion of the NFT proximate the waveguide core 3240 comprises a plasmonic material 3204. FIG. 32C illustrates a cross-section view of the gap NFT shown in FIGS. 32A and 32B. A layer of the NFT 3201 closest to the write pole 3235 comprises a mechanically robust material 3202. The mechanically robust layer 3202 may have a thickness in the range of about 10 nm to 40 nm. A waveguide core 3240 is disposed adjacent and/or directly in contact with the plasmonic material 3204 of the NFT 3201.

Figure 33A:
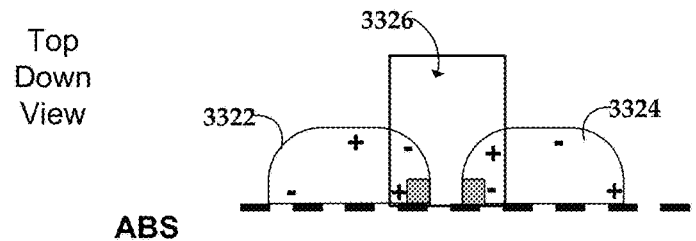
FIGS. 33A-33C illustrate views of a gap NFT having a small corner made from a mechanically robust material in accordance with embodiments described herein.
Figure 33B:
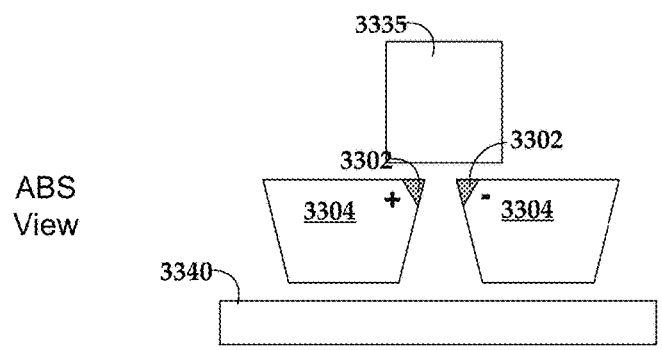
Figure 33C:
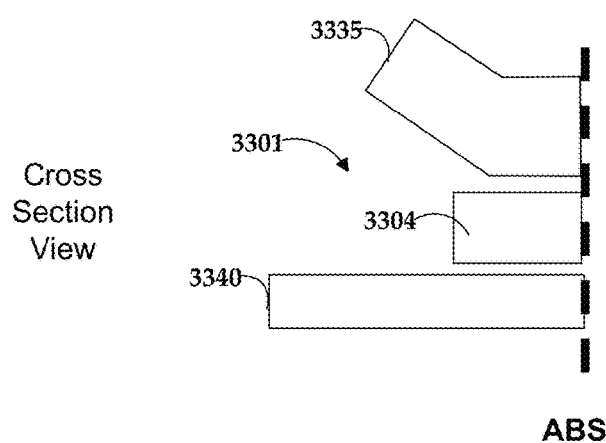

In the embodiment of FIGS. 33A-33C, a small corner of the NFT responsible for confinement is made from a mechanically robust material 3302 and the rest of the plates include a plasmonic material 3304. The top-down view shown in FIG. 33A illustrates the NFT as side-by-side, elongated plates 3322, 3324 with a gap 3326 therebetween. FIG. 33B illustrates an ABS view of the gap NFT of FIG. 33A. From the view of FIG. 33B, it can be observed that the a corner of the NFT facing the write pole 3335 comprises the mechanically robust material 3302 and the remaining portion of the NFT proximate the waveguide core 3340 comprises a plasmonic material 3304. FIG. 33C illustrates a cross-section view of the gap NFT shown in FIGS. 33A and 33B. The small portion of the NFT that comprises the mechanically robust material in FIGS. 33A and 33B is not visible in the cross-section view. A waveguide core 3340 and a write pole 3335 are disposed adjacent and/or directly in contact with the NFT 3301.

Figure 34A:
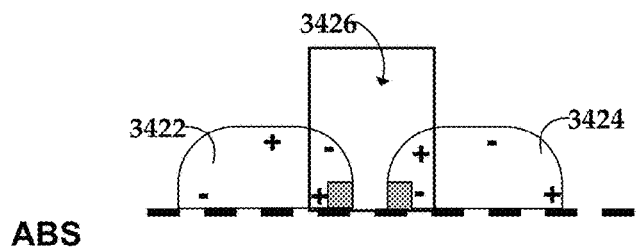
FIGS. 34A-34C show views of a gap NFT having a small corner coated with a mechanically robust material in accordance with various embodiments described herein.
Figure 34B:
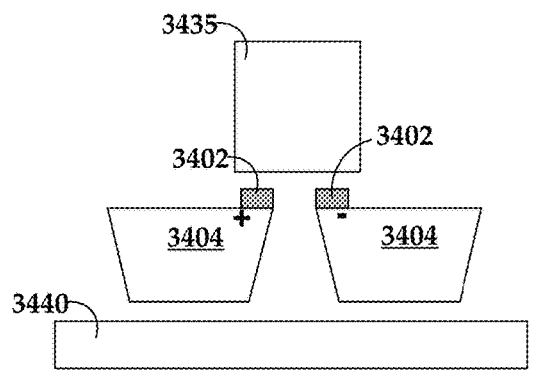
Figure 34C:
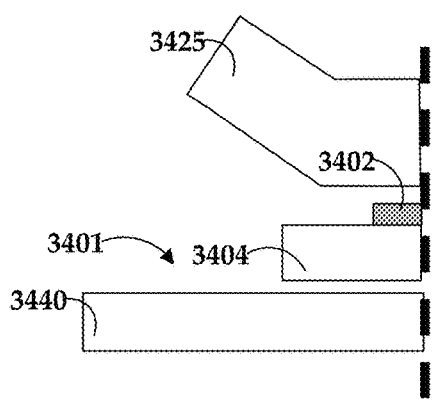

In the embodiment of FIGS. 34A-34C, a small corner of the NFT responsible for confinement may be coated with a mechanically robust material 3402 and the rest of the plates include a plasmonic material 3404. In some cases, the mechanically robust material 3402 potion is fabricated during fabrication of the NFT. According to some embodiments the mechanically robust material portion 3402 is deposited on the NFT after fabrication of the NFT. The top-down view shown in FIG. 34A illustrates the NFT as side-by-side, elongated plates 3422, 3424 with a gap 3426 therebetween. FIG. 34B illustrates an ABS view of the gap NFT of FIG. 34A. From the view of FIG. 34B, it can be observed that a corner surface of the NFT facing the write pole 3435 is coated with the mechanically robust material 3402 and the bottom portion of the NFT proximate the waveguide core 3440 comprises a plasmonic material 3404. FIG. 34C illustrates a cross-section view of the gap NFT shown in FIGS. 34A and 34B. The small portion of the NFT that comprises the mechanically robust material 3402 in FIGS. 34A and 34B is located on a side of the NFT 3401 facing the write pole 3425. A waveguide core 3440 is disposed adjacent to a plasmonic material 3404 portion of the NFT 3401. In some cases, the waveguide core 3440 at least partially encompasses the NFT 3401.

Figure 35A:
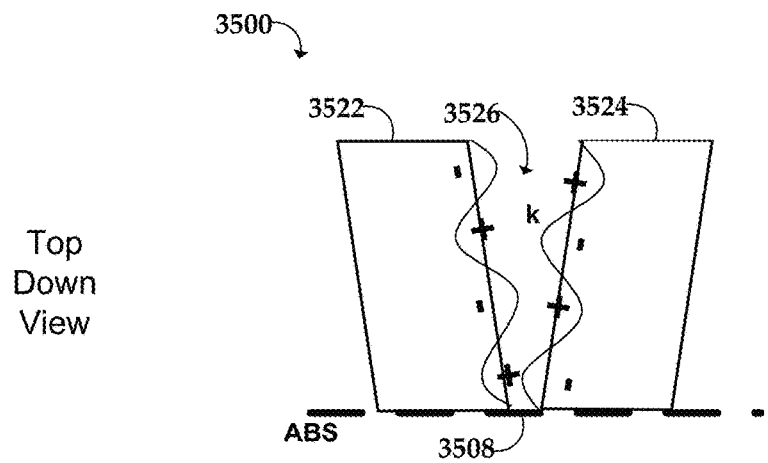
FIGS. 35A-35C illustrate views of another type of gap NFT in accordance with embodiments described herein.
Figure 35B:
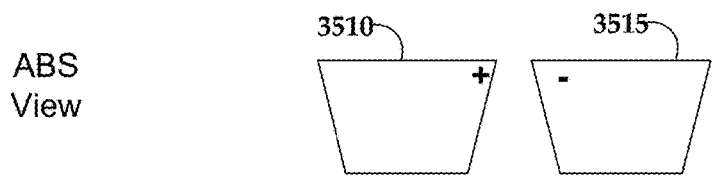
Figure 35C:
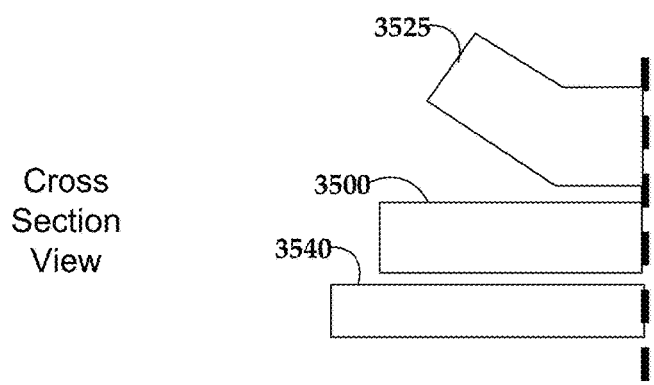

FIGS. 35A-35C illustrate another type of gap NFT in accordance with embodiments described herein. Similarly to FIGS. 35A-35C, the NFT 3500 is configured as side-by-side, elongated plates 3522, 3524 with a tapered gap 3526 therebetween. The plates 3522, 3524 are disposed on the x-y plane, and the gap 3526 runs in the y-direction from an excitation location to the ABS 3508. The gap 3526 and surrounding areas may be filled with a dielectric material. The orientation of the plates 3522, 3524 causes the gap 3526 to have a taper that narrows as it approaches the ABS 3508. An electric field is concentrated along the taper as shown in FIG. 35A. FIG. 35B illustrates an ABS view of the NFT 3500 having plates 3510, 3515. FIG. 35C illustrates a cross-section view of the gap NFT 3500 shown in FIGS. 35A and 35B. The NFT 3500 is disposed between the write pole 3525 and the waveguide core 3540. The waveguide core 3540 may at least partially encompass the NFT.

In the embodiment of FIGS. 36A-36C, a small corner of the NFT at the ABS responsible for confinement is made from a mechanically robust material 3602 and the rest of the plates include a plasmonic material 3604. The top-down view shown in FIG. 36A illustrates the NFT as side-by-side, elongated plates 3622, 3624 with a gap 3626 therebetween. At least a portion of the plates 3622, 3624 comprises the mechanically robust material 3602. FIG. 36B illustrates an ABS view of the gap NFT of FIG. 36A. From the view of FIG. 36B, it can be observed that the a small corner of the NFT proximate the write pole 3635 comprises the mechanically robust material 3602 and the bottom portion of the NFT proximate the waveguide core 3640 comprises a plasmonic material 3604. FIG. 36C illustrates a cross-section view of the gap NFT shown in FIGS. 36A and 36B. The small portion of the NFT that comprises the mechanically robust material in FIGS. 36A and 36B is not visible in the cross-section view. A waveguide core 3640 and a write pole 3635 are disposed adjacent to the NFT 3601. According to various implementations, the waveguide core at least partially encompasses 3640 the NFT 3601.

Figure 37A:
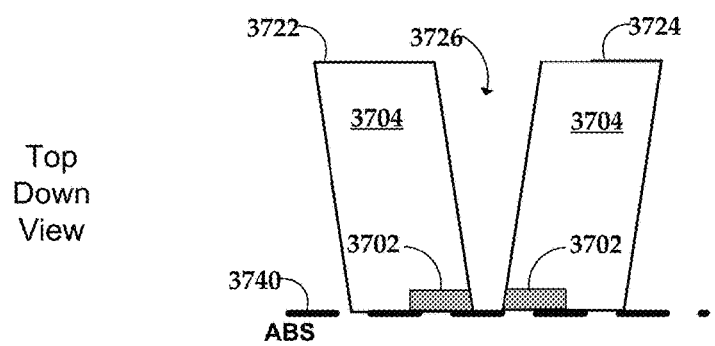
FIGS. 37A-37C illustrate views of an edge made from a mechanically robust material in accordance with embodiments described herein.
Figure 37B:
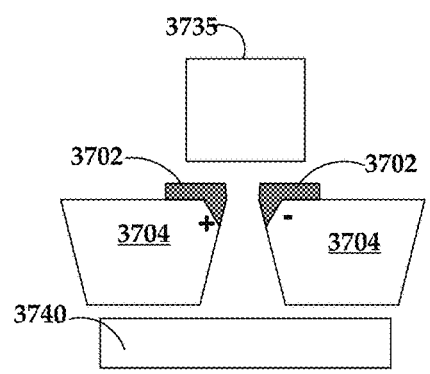
Figure 37C:
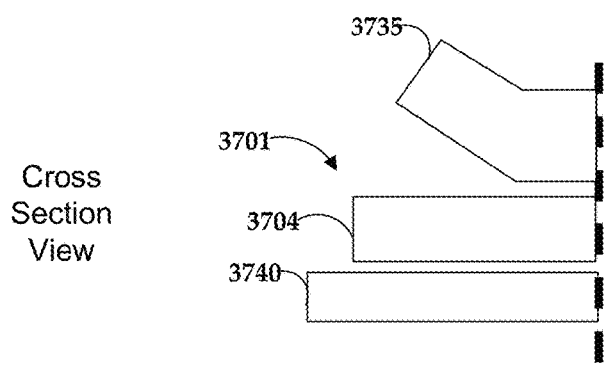

In the embodiment of FIGS. 37A-37C, an edge of the NFT 3701 having the highest concentration of electric field is made from a mechanically robust material 3702 and the rest of the plates include a plasmonic material 3704. The top-down view shown in FIG. 37A illustrates the NFT as side-by-side, elongated plates 3722, 3724 with a gap 3726 therebetween. FIG. 37B illustrates an ABS view of the gap NFT of FIG. 37A. From the view of FIG. 37B, it can be observed that the surface of the NFT facing the write pole 3735 comprises the mechanically robust material 3702 and the bottom portion of the NFT proximate the waveguide core 3740 comprises a plasmonic material 3704. FIG. 37C illustrates a cross-section view of the gap NFT shown in FIGS. 37A and 37B. The small portion of the NFT that comprises the mechanically robust material in FIGS. 37A and 37B is not visible in the cross-section view. A waveguide core 3740 and a write pole 3735 are disposed adjacent to the NFT 3701. In some cases, the waveguide core 3740 at least partially encompasses the NFT 3701.

Figure 38A:
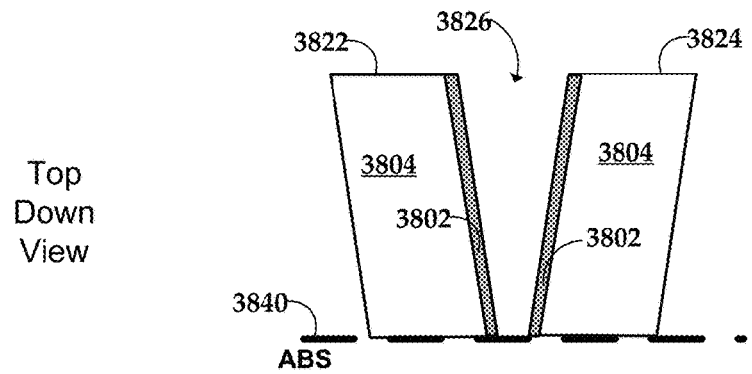
FIGS. 38A-38C show views of a gap NFT having a corner made from a mechanically robust material in accordance with embodiments described herein.
Figure 38B:
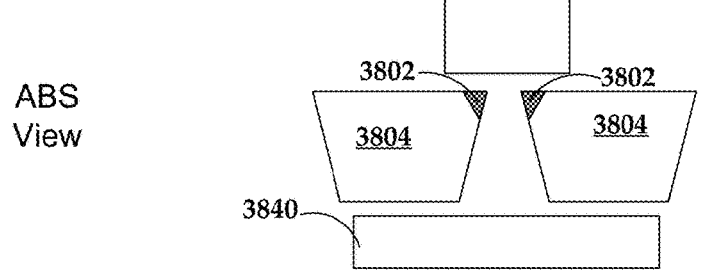
Figure 38C:
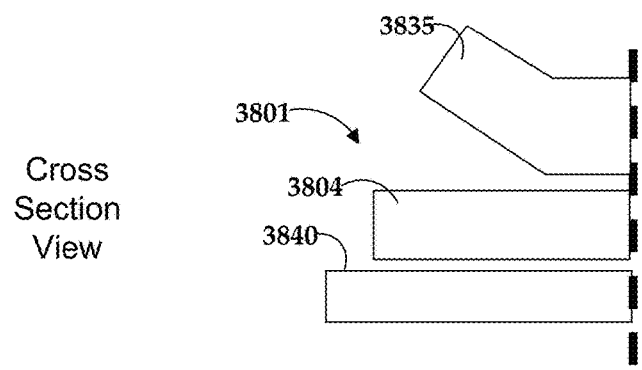

In the embodiment of FIGS. 38A-38C, a small corner of the NFT at the ABS responsible for confinement is made from a mechanically robust material 3802 and the rest of the plates include a plasmonic material 3804. According to various configurations, the mechanically robust portion 3802 of the NFT is fabricated after the NFT has been fabricated. In some cases, the mechanically robust portion of the NFT 3802 is fabricated at the same time as the rest of the NFT. The top-down view shown in FIG. 38A illustrates the NFT as side-by-side, elongated plates 3822, 3824 with a gap 3826 therebetween. FIG. 38B illustrates an ABS view of the gap NFT of FIG. 38A. From the view of FIG. 38B, it can be observed that the a small corner of the NFT proximate the write pole 3835 comprises the mechanically robust material 3802 and the bottom portion of the NFT proximate the waveguide core 3840 comprises a plasmonic material 3804. FIG. 38C illustrates a cross-section view of the gap NFT shown in FIGS. 38A and 38B. The small portion of the NFT that comprises the mechanically robust material in FIGS. 38A and 38B is not visible in the cross-section view. A waveguide core 3840 and a write pole 3835 are disposed adjacent to the NFT 3801. In some cases, the waveguide core 3840 at least partially encompasses the NFT 3801.

Figure 39A:
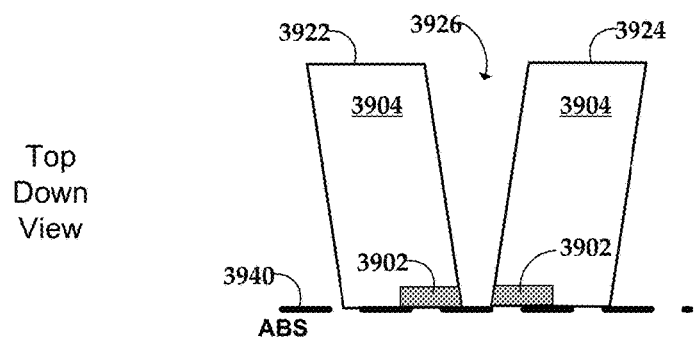
FIGS. 39A-39C show views of a gap NFT having a corner coated with a mechanically robust material in accordance with embodiments described herein.
Figure 39B:
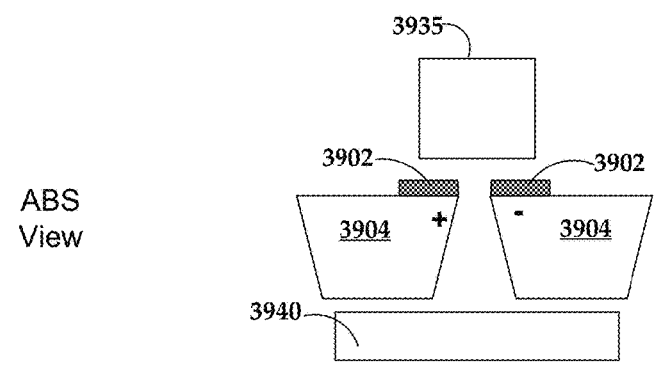
Figure 39C:
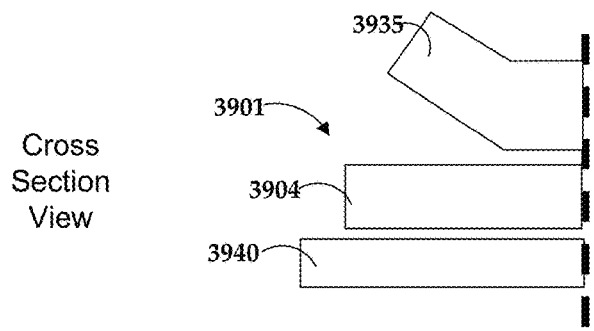

In the embodiment of FIGS. 39A-39C, a small corner of the NFT responsible for confinement may be coated with a mechanically robust material 3902 and the rest of the plates include a plasmonic material 3904. In some cases, the mechanically robust material 3902 portion is fabricated during fabrication of the NFT. According to some embodiments the mechanically robust material 3902 portion is deposited on the NFT after fabrication of the NFT. The top-down view shown in FIG. 39A illustrates the NFT as side-by-side, elongated plates 3922, 3924 with a gap 3926 therebetween. FIG. 39B illustrates an ABS view of the gap NFT of FIG. 39A. From the view of FIG. 39B, it can be observed that a corner surface of the NFT facing the write pole 3935 is coated with the mechanically robust material 3902 and the bottom portion of the NFT proximate the waveguide core 3940 comprises a plasmonic material 3904. FIG. 39C illustrates a cross-section view of the gap NFT shown in FIGS. 39A and 39B. The small portion of the NFT that comprises the mechanically robust material 3902 in FIGS. 39A and 39B is located on a side of the NFT 3901 facing the write pole 3935. A waveguide core 3940 is disposed adjacent to a plasmonic material 3904 portion of the NFT 3901. In some cases, the waveguide core 3940 at least partially encompasses the NFT 3901.

Figure 40A:
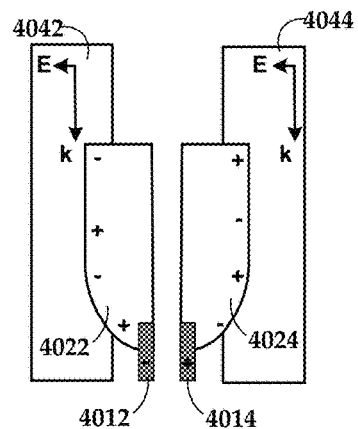
FIGS. 40A-40C illustrate a gap NFT system for use with TE propagating light in accordance with embodiments described herein.
Figure 40B:
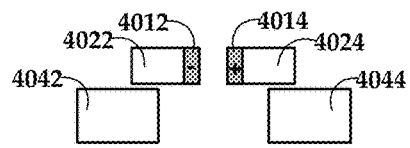
Figure 40C:
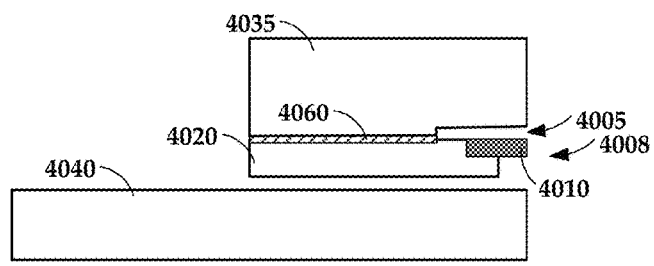

While FIGS. 35A-39C show a gap system configured for use with TE propagating light in a single waveguide, the system may be configured to work with TE propagating light in two waveguides. This configuration allows the magnetic pole to be more proximate to the NFT while still using TE light. FIGS. 40A-40C illustrate a gap NFT system for use with TE propagating light in two waveguides. In this system, the waveguide 4042, 4044 is in a different location and the plates 4022, 4024 have corresponding peg portions 4012, 4014. According to various implementations, the peg portions 4012, 4014 comprise a mechanically robust material. The peg portions 4012, 4014 and the plates 4022, 4024 may comprise different materials. FIG. 40C illustrates a cross section view of a system having a TE gap NFT in accordance with FIGS. 40A and 40B. The system includes a magnetic pole 4035 that is disposed proximate an NFT 4008. A gap 4005 is disposed between the magnetic pole 4035 and the NFT 4008. The NFT 4008 includes plate portions 4020 and peg portions 4010. A diffusion barrier 4060 may be disposed between at least a portion of the plate portions 4020 and the magnetic pole 4035 to prevent interdiffusion between the materials of the magnetic pole 4035 and the plate portions 4020. A waveguide core 4040 is disposed proximate the NFT 4008.

Figure 41A:
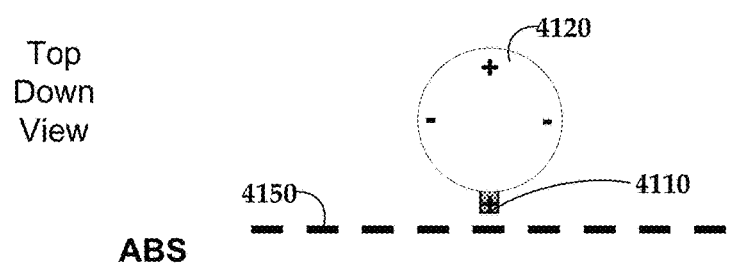
FIGS. 41A-41D illustrate views of a lollipop NFT in accordance with embodiments described herein.
Figure 41B:
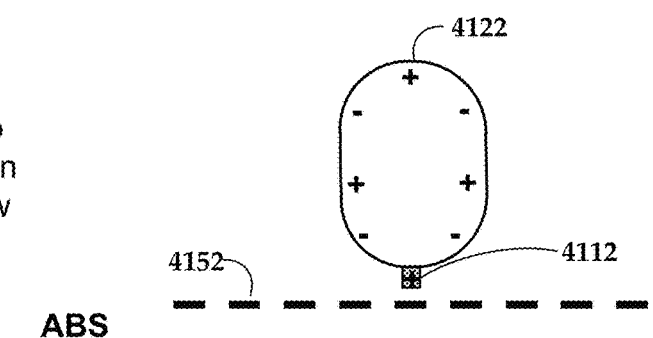

FIGS. 41A-41D illustrate another type of NFT in accordance with embodiments described herein. In FIG. 41A, the NFT comprises an NFT body or disc 4120 and a peg 4110 that extends from the disc 4120 toward the ABS 4150. According to various embodiments, all or a portion of the peg 4110 comprises a mechanically robust material. While, FIG. 41A shows a substantially circular disc when viewed from the top, the disc may be any shape. For example, FIG. 41B illustrates an example in which the disc 4122 has an elliptical shape with a peg 4112 extending toward the media facing surface. The type of NFT described in conjunction with FIGS. 41A and 41B will herein be referred to as a "lollipop" NFT.

Figure 41C:
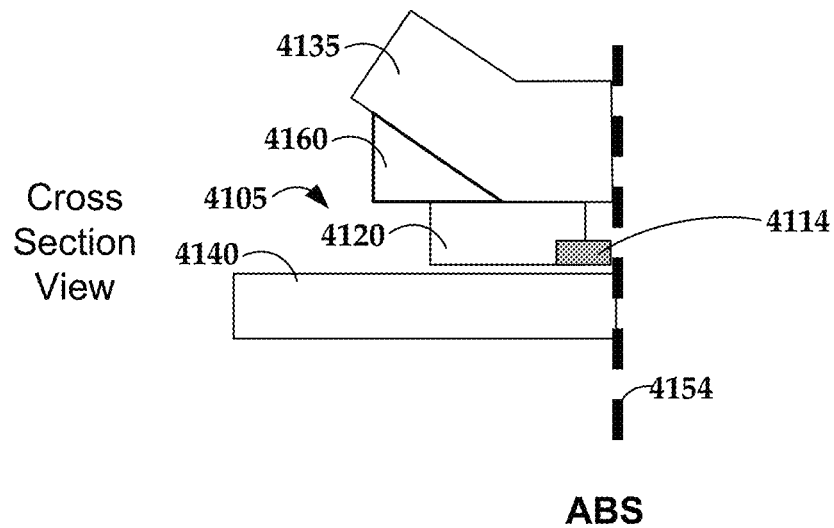
Figure 41D:
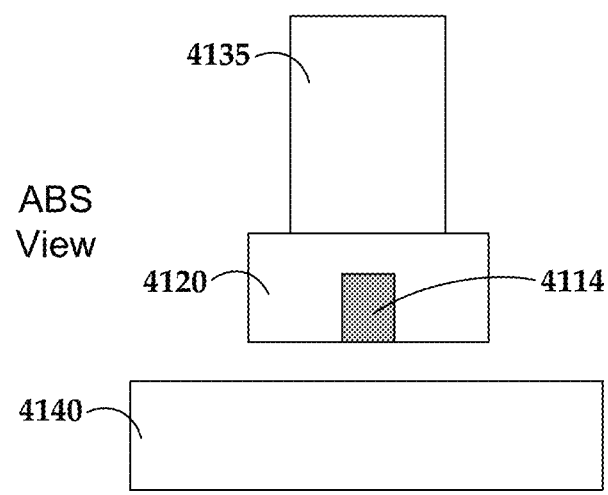

FIG. 41C illustrates a cross section of a slider that includes a lollipop NFT. The slider includes a magnetic pole 4135 and a heat sink 4160 disposed proximate the magnetic pole 4135. An NFT 4105 comprising a disc portion 4120 and a peg portion 4114 extending from the disc portion 4120 toward the ABS 4154 is disposed proximate the magnetic pole 4135. A waveguide core 4140 is disposed proximate the NFT 4105. An ABS view of the lollipop NFT system is shown in FIG. 41D.

Figure 42A:
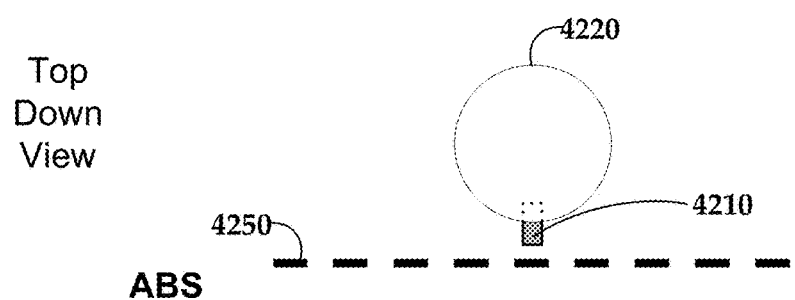
FIGS. 42A and 42B show views of a lollipop NFT having a peg extend under a disc and made from a mechanically robust material in accordance with embodiments described herein.
Figure 42B:
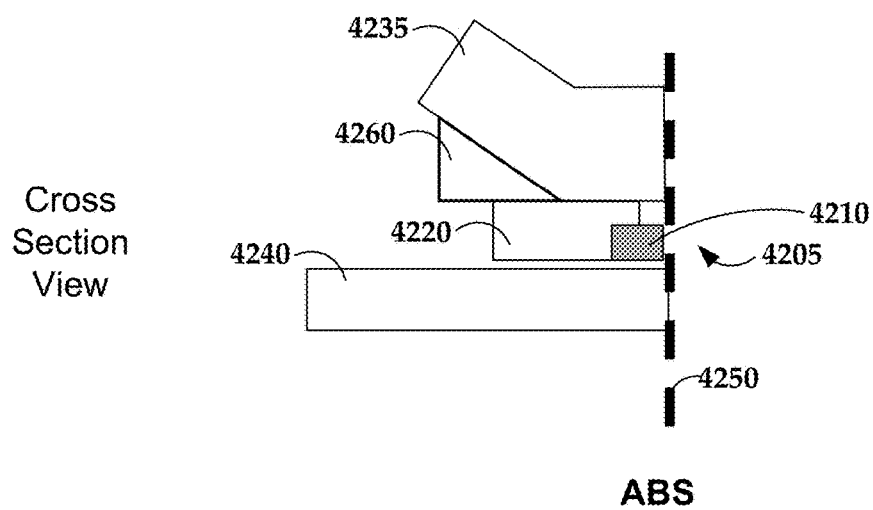

FIGS. 42A and 42B illustrate an embodiment utilizing a lollipop NFT in accordance with embodiments described herein. In FIG. 42A, the NFT comprises an enlarged region or disc 4220 and a peg 4210 that extends from the disc 4220 toward the ABS 4250. According to various embodiments, all or a portion of the peg 4210 comprises a mechanically robust material. The peg 4210 may extend into the disc 4220. For example, the peg 4210 may extend under the disc 4220. FIG. 42B illustrates a cross section of a slider that includes the lollipop NFT described in conjunction with FIG. 42A. The slider includes a magnetic pole 4235 and a heat sink 4260 disposed proximate the magnetic pole 4235. An NFT 4205 comprising a disc portion 4220 and a peg portion 4210 extending from the disc portion 4220 toward the ABS 4250 is disposed proximate the magnetic pole 4235. A waveguide core 4240 is disposed proximate the NFT 4205.

Figure 43A:
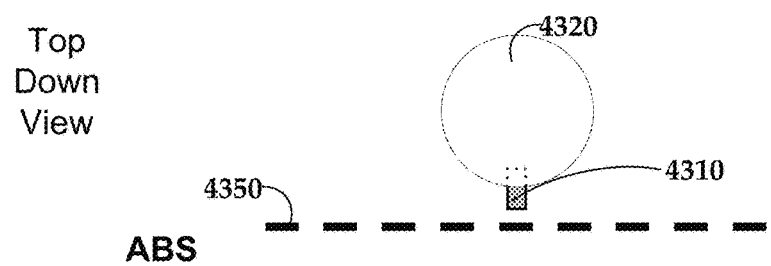
FIGS. 43A and 43B illustrate views of a lollipop NFT having a peg extending into a disc and made from a mechanically robust material in accordance with embodiments described herein.
Figure 43B:
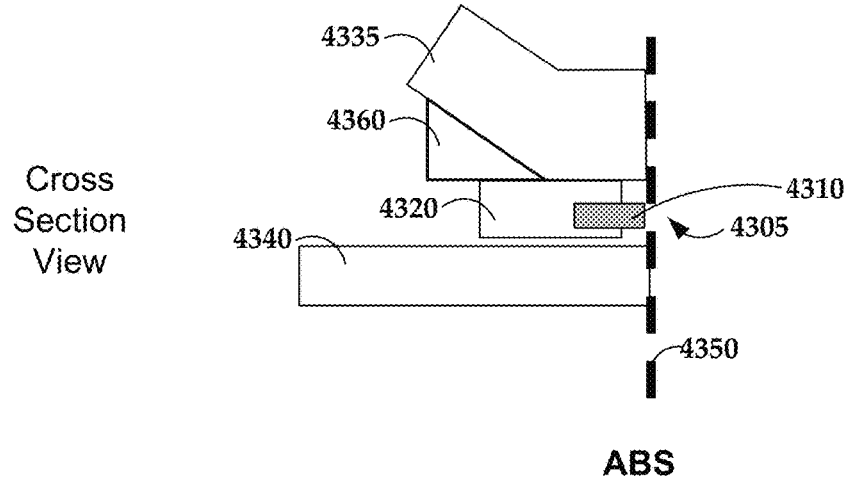

FIGS. 43A and 43B illustrate an embodiment utilizing a lollipop NFT accordance with embodiments described herein. In FIG. 43A, the NFT comprises an enlarged region or disc 4320 and a peg 4310 that extends from the disc 4320 toward the ABS 4350. According to various embodiments, all or a portion of the peg 4310 comprises a mechanically robust material. The peg 4310 may extend into the disc 4320. In the embodiment of FIGS. 43A and 43B, the peg 4310 extends into a central region of the disc 4320. FIG. 43B illustrates a cross section of a slider that includes the lollipop NFT described in conjunction with FIG. 43A. The slider includes a magnetic pole 4335 and a heat sink 4360 disposed proximate the magnetic pole 4335. An NFT 4305 comprising a disc portion 4320 and a peg portion 4310 extending from the disc portion 4320 toward the ABS 4350 is disposed proximate the magnetic pole 4335. A waveguide core 4340 is disposed proximate the NFT 4305.

Figure 44A:
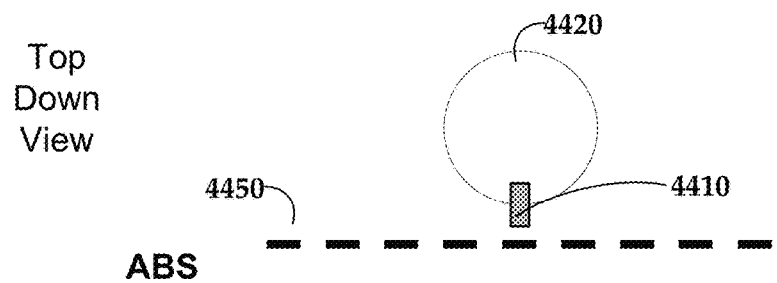
FIGS. 44A and 44B show views of a lollipop NFT having a peg that is disposed on the disc and is made from a mechanically robust material in accordance with embodiments described herein.
Figure 44B:
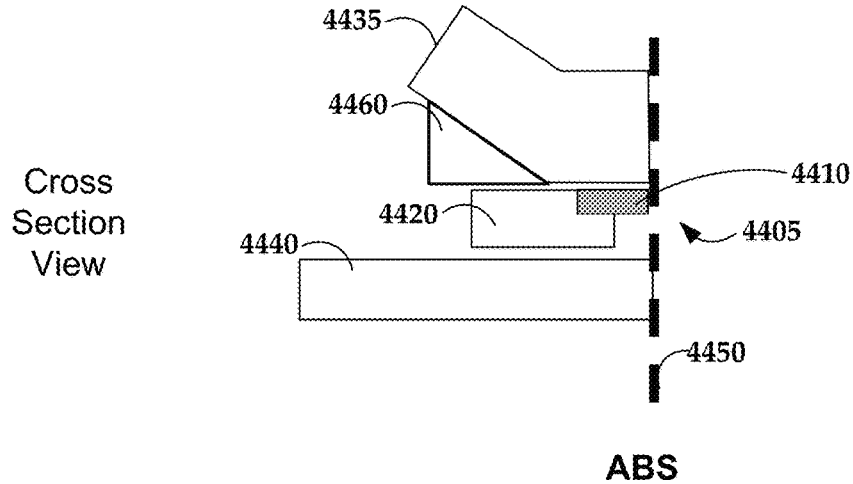

FIGS. 44A and 44B illustrate an embodiment utilizing a lollipop NFT accordance with embodiments described herein. In FIG. 44A, the NFT comprises an enlarged region or disc 4420 and a peg 4410 that extends from the disc 4420 toward the ABS 4450. According to various embodiments, all or a portion of the peg 4410 comprises a mechanically robust material. The peg 4410 is disposed on the disc 4420. FIG. 44B illustrates a cross section of a slider that includes the lollipop NFT described in conjunction with FIG. 44A. The slider includes a magnetic pole 4435 and a heat sink 4460 disposed proximate the magnetic pole 4435. An NFT 4405 comprising a disc portion 4420 and a peg portion 4410 extending from the disc portion 4420 toward the ABS 4450 is disposed proximate the magnetic pole 4435. A waveguide core 4440 is disposed proximate the NFT 4405.

Figure 45A:
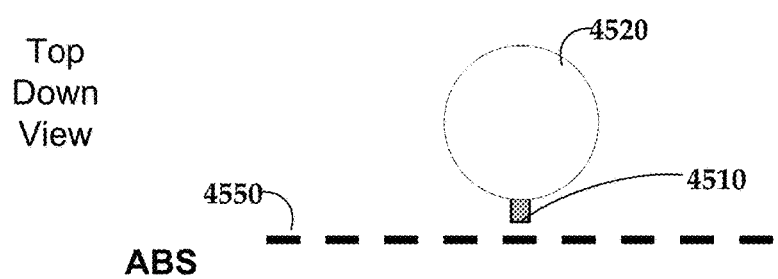
FIGS. 45A and 45B illustrate views of a lollipop NFT having a peg that is abutted to the disc and is made from a mechanically robust material in accordance with embodiments described herein.
Figure 45B:
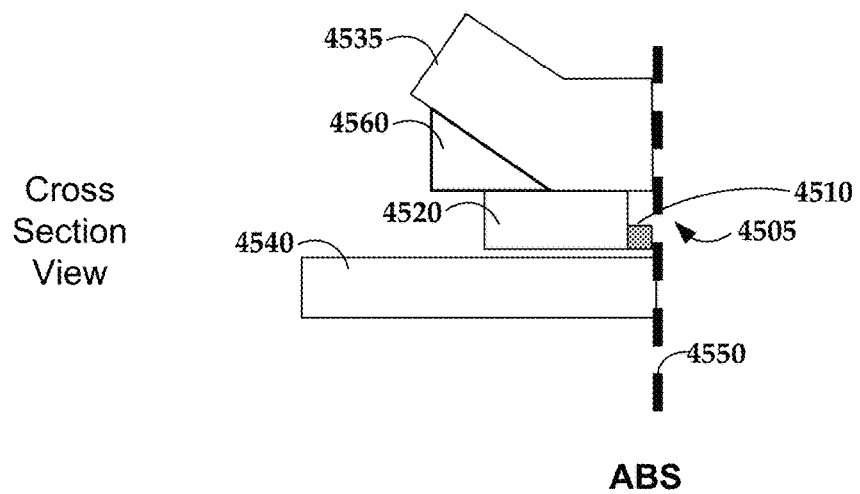

FIGS. 45A and 45B illustrate an embodiment utilizing a lollipop NFT accordance with embodiments described herein. In FIG. 45A, the NFT comprises an enlarged region or disc 4520 and a peg 4510 that extends from the disc 4520 toward the ABS 4550. According to various embodiments, all or a portion of the peg 4510 comprises a mechanically robust material. The peg 4510 is abutted to the disc 4520 and does not extend into the disc 4520 as described in other examples. FIG. 45B illustrates a cross section of a slider that includes the lollipop NFT described in conjunction with FIG. 45A. The slider includes a magnetic pole 4535 and a heat sink 4560 disposed proximate the magnetic pole 4535. An NFT 4505 comprising a disc portion 4520 and a peg portion 4510 extending from the disc portion 4520 toward the ABS 4550 is disposed proximate the magnetic pole 4535. A waveguide core 4540 is disposed proximate the NFT 4505.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A near-field transducer, comprising:
a base portion comprising a thermally robust material; and
a peg embedded in a part of the base portion that faces a media-facing surface, the peg comprising an elongated outer part that extends from a lower edge of the enlarged portion towards the media-facing surface and an embedded part that is embedded within the base portion, the peg comprising a plasmonic material.

2. The near-field transducer of claim 1, wherein the peg comprises Au.

3. The near-field transducer of claim 1, wherein the base portion comprises at least one of Rh and Ir.

4. The near-field transducer of claim 1, wherein the base portion comprises a recess that exposes at least one side of the peg.

5. The near-field transducer of claim 1, wherein the peg has a thickness that is less than that of the base portion.

6. The near-field transducer of claim 1, further comprising a lower base portion.

7. The near-field transducer of claim 6, wherein the lower base portion comprises a thermally robust material.

8. The near-field transducer of claim 6, wherein the lower base portion comprises at least one of Rh and Ir.

9. The near-field transducer of claim 1, wherein a first portion of the peg comprises at least one of Rh and Jr and a second portion of the peg comprises a plasmonic material.

10. The near-field transducer of claim 1, wherein a first portion of the base portion comprises at least one of Rh and Jr and a second portion of the base portion comprises a plasmonic material.

11. The near-field transducer of claim 1, wherein the peg comprises a plurality of layers and at least one layer of the plurality of layers comprises a plasmonic material.

12. The near-field transducer of claim 11, wherein at least one layer of the plurality of layers comprises at least one of Rh and Ir.

13. The near-field transducer of claim 1, wherein the base portion comprises a plurality of layers and at least one layer of the plurality of layers comprises at least one of Rh and Ir.

14. The near-field transducer of claim 13, wherein at least one layer of the plurality of layers comprises a plasmonic material.

15. A recording head, comprising:
 a magnetic write transducer
 a waveguide; and
 a near-field transducer, proximate the magnetic write transducer and the waveguide, the near-field transducer comprising:
  a base portion comprising a thermally robust material; and
  a peg embedded in a part of the base portion that faces a media-facing surface, the peg comprising an elongated outer part that extends from a lower edge of the base portion towards the media-facing surface and an embedded part that is embedded within the base portion, the peg comprising a plasmonic material.

16. The recording head of claim 15, wherein the peg comprises Au.

17. The recording head of claim 15, wherein the base portion comprises at least one of Rh and Ir.

18. The recording head of claim 15, wherein the base portion comprises a recess that exposes at least one side of the peg.

19. The recording head of claim 15, wherein the peg has a thickness that is less than that of the base portion.

20. The recording head of claim 15, wherein the base portion comprises a lower base portion comprising a thermally robust material.

* * * * *